(12) United States Patent
O'Dor et al.

(10) Patent No.: US 9,165,536 B2
(45) Date of Patent: Oct. 20, 2015

(54) SYSTEMS AND METHODS FOR PROJECTING COMPOSITE IMAGES

(71) Applicant: IMAX Corporation, Mississauga (CA)

(72) Inventors: Matthew O'Dor, Toronto (CA); Steven Read, Mississauga (CA); Anton Baljet, Oakville (CA); Philip Insull, Oakville (CA)

(73) Assignee: IMAX Corporation, Mississauga, ON ( * ) Notice: Subject to any disclaimer, the term of this patent is extended or adjusted under 35 U.S.C. 154(b) by 228 days.

(21) Appl. No.: 14/019,855

(22) Filed: Sep. 6, 2013

(65) Prior Publication Data
US 2014/0055449 A1 Feb. 27, 2014

Related U.S. Application Data

(63) Continuation of application No. 11/912,524, filed as application No. PCT/US2006/015892 on Apr. 26, 2006, now Pat. No. 8,567,953.

(60) Provisional application No. 60/674,981, filed on Apr. 26, 2005.

(51) Int. Cl.
*H04N 13/04* (2006.01)
*G03B 21/14* (2006.01)
(Continued)

(52) U.S. Cl.
CPC ............. *G09G 5/377* (2013.01); *G06T 15/00* (2013.01); *H04N 9/3147* (2013.01);
(Continued)

(58) Field of Classification Search
CPC . G09G 5/377; H04N 9/3147; H04N 13/0422; H04N 13/0425; H04N 13/0434; H04N 13/0454; H04N 13/0459; G06T 15/00

USPC .......... 353/7; 250/208.1, 205, 559.4; 382/154
See application file for complete search history.

(56) References Cited

U.S. PATENT DOCUMENTS 2,530,417 A 11/1950 Young
3,358,558 A 12/1967 Bradley
(Continued)

FOREIGN PATENT DOCUMENTS

DE 10251217 6/2004
EP 01434434 6/2004
(Continued)

OTHER PUBLICATIONS

Japanese Application No. JP2013-141211, Office Action mailed on Mar. 17, 2015, 5 pages. (3 pages for the Original Document and 2 pages for the English Translation).
(Continued)

*Primary Examiner* — Seung C Sohn
(74) *Attorney, Agent, or Firm* — Kikpatrick Townsend & Stockton LLP

(57) ABSTRACT

Embodiments of the present invention comprise electronic projection systems and methods. One embodiment of the present invention comprises a method of creating composite images with a projection system comprising as first projector and at least a second projector, comprising generating a correspondence map of pixels for images by determining offsets between pixels from at least a second image from the second projector and corresponding pixels from a first image from the first projector, receiving a source image, warping the source image based at least in part on the correspondence map to produce a warped image, and displaying the source image by the first projector and displaying the warped image by the second projector to create a composite image.

32 Claims, 21 Drawing Sheets

(51) Int. Cl.
　　*G09G 5/377*　　　(2006.01)
　　*H04N 9/31*　　　(2006.01)
　　*G06T 15/00*　　　(2011.01)

(52) U.S. Cl.
　　CPC ...... *H04N 13/0422* (2013.01); *H04N 13/0425* (2013.01); *H04N 13/0434* (2013.01); *H04N 13/0454* (2013.01); *H04N 13/0459* (2013.01)

(56) References Cited

U.S. PATENT DOCUMENTS

| | | | |
|---|---|---|---|
| 3,679,303 | A | 7/1972 | La |
| 3,943,279 | A | 3/1976 | Austefiord |
| 4,281,341 | A | 7/1981 | Byatt |
| 5,025,314 | A | 6/1991 | Tang et al. |
| 5,206,760 | A | 4/1993 | Nakashima et al. |
| 5,386,253 | A | 1/1995 | Fielding |
| 5,490,009 | A | 2/1996 | Venkateswar |
| 5,762,413 | A | 6/1998 | Colucci et al. |
| 5,902,030 | A | 5/1999 | Blanchard |
| 5,956,000 | A | 9/1999 | Kreitman et al. |
| 5,988,817 | A | 11/1999 | Mizushima et al. |
| 6,115,022 | A | 9/2000 | Mayer, III et al. |
| 6,222,593 | B1 | 4/2001 | Higurashi et al. |
| 6,231,189 | B1 | 5/2001 | Colucci et al. |
| 6,456,339 | B1 | 9/2002 | Surati et al. |
| 6,538,705 | B1 | 3/2003 | Higurashi et al. |
| 6,568,816 | B2 | 5/2003 | Mayer, III et al. |
| 6,570,623 | B1 | 5/2003 | Li et al. |
| 6,637,887 | B2 | 10/2003 | Yamanaka |
| 6,664,531 | B2 | 12/2003 | Gartner |
| 6,695,451 | B1 | 2/2004 | Yamasaki et al. |
| 6,733,138 | B2 | 5/2004 | Raskar |
| 6,760,075 | B2 | 7/2004 | Mayer et al. |
| 6,771,272 | B2 | 8/2004 | Deering |
| 6,804,406 | B1 | 10/2004 | Chen |
| 6,814,448 | B2 | 11/2004 | Ioka |
| 6,824,271 | B2 | 11/2004 | Ishii et al. |
| 6,834,965 | B2 | 12/2004 | Raskar et al. |
| 6,871,961 | B2 | 3/2005 | Balu et al. |
| 7,306,341 | B2 * | 12/2007 | Chang ............ 353/94 |
| 8,567,953 | B2 | 10/2013 | O'Dor et al. |
| 2001/0005261 | A1 | 6/2001 | Martin et al. |
| 2001/0013843 | A1 | 8/2001 | Fujiwara et al. |
| 2002/0041708 | A1 | 4/2002 | Pettitt |
| 2002/0054274 | A1 | 5/2002 | Bloeche l |
| 2002/0180727 | A1 | 12/2002 | Guckenberqer |
| 2003/0142883 | A1 | 7/2003 | Ishii |
| 2004/0085256 | A1 | 5/2004 | Hereld et al. |
| 2004/0085477 | A1 | 5/2004 | Majumder et al. |
| 2004/0239885 | A1 | 12/2004 | Jaynes et al. |
| 2005/0083402 | A1 | 4/2005 | Klose |
| 2005/0110959 | A1 | 5/2005 | Miyazawa et al. |
| 2005/0117126 | A1 | 6/2005 | Miyazawa et al. |
| 2005/0146644 | A1 | 7/2005 | Miyazawa et al. |
| 2005/0179874 | A1 | 8/2005 | Miyazawa |
| 2005/0206857 | A1 | 9/2005 | Yamada |
| 2005/0271299 | A1 | 12/2005 | Allto et al. |
| 2006/0192925 | A1 * | 8/2006 | Chang ............ 353/94 |
| 2008/0309884 | A1 | 12/2008 | O'Dor et al. |

FOREIGN PATENT DOCUMENTS

| | | |
|---|---|---|
| EP | 1606937 | 12/2005 |
| EP | 1606938 | 12/2005 |
| JP | 05268552 | 10/1993 |
| JP | 6178327 | 6/1994 |
| JP | 06178327 | 6/1994 |
| JP | 06261860 | 9/1994 |
| JP | 08182013 | 7/1996 |
| JP | 09326981 | 12/1997 |
| JP | 10333094 | 12/1998 |
| JP | 2001042852 | 2/2001 |
| JP | 2001356005 | 12/2001 |
| JP | 200272359 | 3/2002 |
| JP | 200366449 | 3/2003 |
| JP | 2003125317 | 4/2003 |
| JP | 2003322908 | 11/2003 |
| JP | 200432665 | 1/2004 |
| JP | 2004165710 | 6/2004 |
| JP | 2004228824 | 8/2004 |
| JP | 2004271934 | 9/2004 |
| JP | 2005043656 | 2/2005 |
| JP | 2005099150 | 4/2005 |
| JP | 3735158 | 1/2006 |
| WO | 9904563 | 1/1999 |
| WO | 02019028 | 7/2002 |

OTHER PUBLICATIONS

Japanese Application No. JP2013-141216, Office Action mailed on Mar. 17, 2015, 5 pages. (3 pages for the Original Document and 2 pages for the English Translation).
U.S. Appl. No. 11/912,524, Non-Final Office Action, mailed Mar. 31, 2010, 10 pages.
U.S. Appl. No. 11/912,524, Notice of Allowance, mailed Sep. 21, 2010, 6 pages.
Anonymous, "Seamless, High-Resolution Display System", Hitachi Review, Special Issue, Jul. 2001, p. 54.
Arimoto et al., "Wide Viewing Area Glassless Stereoscopic Display Using Multiple Projectors", Proceedings of SPIE—The International Society for Optical Engineering, vol. 3295, 1998, pp. 186-192.
Bern et al., "Optimized Color Gamuts for Tiled Displays", Proceedings of the Annual Symposium on Computational Geometry, 2003, pp. 274-281.
Brown et al., "Camera-Based Calibration Techniques for Seamless Multiprojector Displays", IEEE Transactions on Visualization and Computer Graphics, vol. 11, No. 2, Mar. 2005, 193-206.
Brown et al., "Laser Pointer Interaction for Camera-Registered Multi-Projector Displays", IEEE International Conference on Image Processing, 2003, vol. 1, pp. 913-916.
Brown et al., "PixelFlex: A Reconfigurable Multi-Projector Display System", Proceedings of the IEEE Visualization Conference, 2001, pp. 167-174.
Canadian Patent Application No. 2,605,670, Office Action, mailed Nov. 13, 2012, 2 pages.
Cham et al., "Shadow Elimination and Occluder Light Suppression for Multi-Projector Displays", Proceedings 2003 IEEE Computer Society Conference on Computer Vision and Pattern Recognition, 2003, vol. 2, pp. II-513-II-520.
Chen et al., "Data Distribution Strategies for High-Resolution Displays", Computers & Graphics, Oct. 2001, vol. 25, No. 5, pp. 811-818.
Chen et al., "Fundamentals of Scalable High Resolution Seamlessly Tiled Projection System", Proceedings of SPIE—The International Society for Optical Engineering, 2001, vol. 4294, pp. 67-74.
Chen et al., "Strategies for 3D Video with Wide Fields-Of-View", IEEE Proceedings: Optoelectronics, 2, Apr. 2001, vol. 148, pp. 85-90.
Chen, "Scalable and Ultra-High Resolution MPEG Video Delivery on Tiled Displays", Princeton University, the Sciences and Engineering, vol. 64-10B, Doc. No. AAI3107869, 175 pages.
Chinese Patent Application No. 200680018049.3, Office Action, mailed Oct. 9, 2009, 10 pages.
Chinese Patent Application No. 200680018049.3, Office Action, mailed Oct. 31, 2008, 14 pages.
Chinese Patent Application No. 200680018049.3, Office Action, mailed Apr. 21, 2011, 6 pages.
Deguchi et al., "Autocalibration of a Projector-Screen-Camera System: Theory and Algorithm for Screen-to-Camera Nomography Estimation", Proceedings of the IEEE International Conference on Computer Vision, 2003, vol. 2, pp. 774-781.
Dohi et al., "High-Quality Integral Videography Using a Multiprojector", Optics Express, 6, Mar. 2004, vol. 12, pp. 1067-1076.
Eichenlaub et al., "Autostereoscopic-Projection Displays", Proceedings of the SPIE—The International Society for Optical Engineering, 1995, vol. 2409.

(56) References Cited

OTHER PUBLICATIONS

Hasegawa et al., "Technology for Seamless Multi-Projection onto a Hybrid Screen Composed of Differently Shaped Surface Elements", Kyokai Joho Imeji Zasshi/Journal of the Institute of Image Information and Television Engineers, Nov. 2003, vol. 57, No. 11, pp. 1543-1550.
Hashimoto et al., "Non-Distorted Image Projection Method for a Multi-Projection Display and a Curved Screen", Kyokai Joho Imeji Zasshi/Journal of the Institute of Image Information and Television Engineers, Apr. 2004, vol. 58, No. 4, pp. 507-513.
He et al., "Achieving Color Uniformity Across Multi-Projector Display", Proceedings of the IEEE Visualization Conference, 2000, pp. 117-124.
Hereld et al., "DottyToto: A Measurement Engine for Aligning Multiprojector Display Systems", Proceedings of the SPIE—The International Society for Optical Engineering, 2003, vol. 5002, pp. 73-86.
Jaynes et al., "Camera-Based Detection and Removal of Shadows from Interactive Multiprojector Displays", IEEE Transactions on Visualization and Computer Graphics, May/Jun. 2004, vol. 10, No. 3, pp. 290-301.
Jedrysik et al., "X Windows-Based Interactive Test Patterns for Overlaid Stereoscopic and Tiled Displays", Air Force Research Lab, Rome, NY, In-House Reprt, Unclassified, Report No. AFRL-IF-RS-TR-1999-251, 40 pages.
Japanese Patent Application No. 2008-509096, Final Office Action, mailed Jan. 8, 2013, 6 pages.
Japanese Patent Application No. 2008-509096, Office Action, mailed Dec. 6, 2011, 14 pages.
Korean Patent Application No. 10-2007-7027424, Office Action, mailed Aug. 28, 2012, 10 pages.
Kurita, "35.1: Moving Picture Quality Improvement for Hold-type AM-LCDs", SID 01 Digest, 2001, pp. 986-989.
Li et al., "A Survey of Multi-Projector Tiled Display Wall Construction", Proceedings. Third International Conference on Image and Graphics, 2004, pp. 452-455.
Liao et al., "Scalable High-Resolution Integral Videography Autostereoscopic Display with a Seamless Multiprojection System", Applied Optics, Jan. 20, 2005, vol. 44, No. 3, pp. 305-315.
Mahoney, "A Big Picture Show", Computer Graphics World, Dec. 1999, vol. 22, No. 12, pp. 15, 17.
Majumder, "A Practical Framework to Achieve Perceptually Seamless Multi-Projector Displays", The University of North Carolina at Chapel Hill, the Sciences and Engineering, 2003, vol. 64-08B.
Majumder, "Camera Based Evaluation of Photometric Compensation Methods on Multi-Projector Displays", Proceedings—International Conference on Image Processing, ICIP, 2004, vol. 2, pp. 3527-3530.
Majumder, "Color Non-Uniformity in Projection-Based Displays: Analysis and Solutions", IEEE Transactions on Visualization and Computer Graphics, Mar.-Apr. 2004, vol. 10, No. 2, pp. 177-188.
Majumder, "Contrast Enhancement of Multi-Displays Using Human Contrast Sensitivity", Proceedings. 2005 IEEE Computer Society Conference on Computer Vision and Pattern Recognition, 2005, vol. 2, pp. 377-382.
Majumder, "Modeling Color Properties of Tiled Displays", Computer Graphics Forum, Jun. 2005, vol. 24, No. 2, pp. 149-163.
Majumder, "Perceptual Photometric Seamlessness in Projection-Based Tiled Displays", ACM Transactions on Graphics, Jan. 2005, vol. 24, No. 1, pp. 118-139.
Majumder, "Properties of Color Variation Across a Multi-Projector Display", SID Conference Record of the International Display Research Conference, 2002, pp. 807-810.
Majumder, "Is Spatial Super-Resolution Feasible Using Overlapping Projectors?", IEEE International Conference on Acoustics, Speed, and Signal Processing, Mar. 2005, IV-209.
Matsuo, "Visualization in Aerospace Research with a Large Wall Display System", Proceedings of SPIE—The International Society for Optical Engineering, 2002, vol. 4660, pp. 310-319.
Matusik et al., "3D TV: A Scalable System for Real-Time Acquisition, Transmission, and Autostereoscopic Display of Dynamic Scenes", ACM Transaction on Graphics, 2004, vol. 23, No. 3, pp. 814-824.
Mayer, "Design Considerations and Applications for Innovative Display Options Using Projector Arrays", Proceedings of SPIE—The International Society for Optical Engineering, Jan. 1, 1996, vol. 2650, pp. 131-139.
Minakawa et al., "Elliptic vs. Rectangular Blending for Multi-Projection Displays", IEICE Transactions on Information and Systems, Jun. 2004, vol. E87-D, No. 6, pp. 1517-1526.
Moriya et al., "Multi-Camera and Multi-Projector Based Seamless Live Image Display System", Proceedings, 10th International Multimedia Modeling Conference, 2004, pp. 265-272.
Okatani et al., "Autocalibration of a Projector-Camera System", IEEE Transactions on Pattern Analysis and Machine Intelligence, Dec. 2005, vol. 27, No. 12, pp. 1845-1855.
International Patent Application No. PCT/US2006/015892, International Search Report and Written Opinion, Sep. 19, 2006.
Raij et al., "Auto-Calibration of Multi-Projector Display Walls", Proceedings of the 17th International Conference on Pattern Recognition, 2004, vol. 1, pp. 14-17.
Raskar, "Immersive Planar Display Using Roughly Aligned Projectors", Proceedings of IEEE Virtual Reality Annual International Symposium, 2000, pp. 109-115.
Raskar et al., "Multi-Projector Displays Using Camera-Based Registration", Proceedings of the IEEE Visualization Conference, 1999, pp. 161-168.
Saito, "Large and High-Fidelity Projection System Powered by Vision Plex/sup (R)/Technology", Journal of the Society of Photographic Science and Technology of Japan, 2005, vol. 68, No. 1, pp. 27-30.
Samanta et al., "Load Balancing for Multi-Projector Rendering Systems", Eurographics/Siggraph Eurograph Workshop on Graphics Hardware, 1999, pp. 107-116.
Schikore et al., "High-Resolution Multi-Projector Display Walls", IEEE Computer Graphics and Applications, 2000, vol. 20, No. 4, pp. 38-44.
Starkweather, "DSHARP—a Wide-Screen Multi-Projector Display", Journal of Optics A: Pure and Applied Optics, Sep. 2003, vol. 5, No. 5.
Sukthankar et al., "Dynamic Shadow Elimination for Multi-Projector Displays", Procedure IEEE Computer Conference: Computer Vision Pattern Recognition, 2001, 2:I1151-I1157.
Takahashi et al., "Optical System and Characteristics of an LCD Projector with Interleaved Pixels Using Four LCD Projectors", IEEE Transactions on Circuits and Systems for Video Technology, Feb. 1995, vol. 5, No. 1, pp. 41-47.
Van Baar et al., "Seamless Multi-Projector Display on Curved Screens", IPT/EGVE 2003. Seventh Immersive Projection Technology Workshop, Ninth Eurographics Workshop on Virtual Environments, 2003, pp. 281-286.
Canadian Application No. 2,844,683, Office Action mailed on Jan. 15, 2015, 3 pages.
Indian Patent Application No. 4087/KOLNP/2007, First Examination Report mailed Feb. 28, 2014, 2 pages.
Japanese Patent Application No. 2013-141211, Office Action mailed on Apr. 22, 2014, 10 pages (5 pages of English Translation and 5 pages of Official Copy).
Japanese Patent Application No. 2013-141216, Office Action mailed on Apr. 22, 2014, 11 pages (5 pages of English Translation and 6 pages of Official Copy).

* cited by examiner

SYSTEMS AND METHODS FOR PROJECTING COMPOSITE IMAGES

CROSS-REFERENCE TO RELATED APPLICATIONS

This is a continuation of U.S. patent application Ser. No. 11/912,524, filed May 27, 2008 (allowed), which is a U.S. national phase under 35 U.S.C. 371 of International Patent Application No. PCT/US2006/015892, filed Apr. 26, 2006, which claims the benefit of U.S. Provisional Application No. 60/674,981, filed Apr. 26, 2005, each of which is incorporated herein by reference in its entirety.

FIELD OF THE INVENTION

This invention generally relates to the field of projection displays and more particularly to the field of electronic projection systems comprising two or more projectors whose output is combined to form a composite image.

BACKGROUND

Increasingly there is a need for motion picture producers and exhibitors to differentiate their product at motion picture theatre multiplexes from that of competitors and to differentiate the theatre experience from that which customers can obtain at home. One approach is to provide images that are larger, sharper and brighter than what viewers can experience elsewhere.

A number of attempts have been made over the years to improve the performance of film based projectors by tiling multiple projectors together (e.g. Cinerama in the 1950s) or by using a larger 5 perforation 70 mm film format (e.g. Todd AO or Cinemascope). The applicant, IMAX Corporation, successfully developed a higher performance motion picture system using a 15 perforation 70 mm film format; enabled by a rolling loop film transportation mechanism.

Another approach to differentiate the performance of film based projectors is to exhibit 3D motion pictures. This approach has been commercialized by various organizations including the applicant over the years. Typically 3D presentation requires two filmstrips, one for each eye, and two separate projectors to display the images contained on the filmstrips. Sometimes it may be desirable to convert such a system so that a standard 2D motion picture can be shown, and in the case of a two projector system it is straight forward; one projector can be switched off while the other is used. We shall see that the invention disclosed below has the benefit of improving performance by using the second projector in 2D operation rather than letting it sit idle.

An emerging trend within the motion picture industry is to replace standard film based projection with state of the art electronic projectors for a variety of reasons including cost savings in motion picture distribution, and presentation of live events in real time. A disadvantage of current electronic projectors is that they are limited in resolution and light output required for large immersive screens. This is mainly due to manufacturing economics and the current emphasis on electronic projectors that propose to compete with standard 35 mm film based projection only. One approach to deal with the resolution and light output limits of electronic projectors is to tile or combine the output of multiple separate projectors to form one large composite image at the display screen surface. A number of patents have been granted discussing various methods of tiling or stitching together the images of separate electronic projectors including:

U.S. Pat. No. 5,956,000 discloses a method of combining N projectors together to form a composite image where the sub-images overlap and where the overlap areas are modulated to compensate for the increased brightness in those regions. The sub images are also corrected for misalignments.

U.S. Pat. No. 6,115,022 involves the use of a three-dimensional array of smoothing factors that is applied to the blending of overlapped image seams as well as to other composite image artifacts.

U.S. Pat. No. 6,456,339 discloses a method of generating a projector to screen map by combining the results of a camera to screen mapping with a camera to projector mapping. The projector to screen map is used to produce a pixel correcting function that in turn is used to warp images to correct for misalignments and to correct for illuminance and color artifacts in the region of the screen where the images overlap.

U.S. Pat. No. 6,222,593 describes a multiple projector system that tiles images together to achieve a high resolution display. Images are captured from a camera and parameters are calculated to permit warping the output of each of the projectors via analytic expressions.

U.S. Pat. Nos. 6,568,816 and 6,760,075 describes a projection system, which has a single light source that supplies light to multiple projection heads whose output are sub-images that overlap to form composite images. The single light source ensures that colorimetery matching problems between the sub-images are eliminated.

U.S. Pat. No. 6,570,623 discloses the use of blending frames located between the projection lenses and the display screen to control the brightness of the images in the overlapping region, and further discloses the use of an adaptive technique using a camera based iterative algorithm to fine tune the blending of overlapped images.

U.S. Pat. No. 6,771,272 discloses a graphics system comprising pixel calculation units and a sample buffer that is used to correct for display non-uniformities, such as seam overlap brightness by appropriately scaling pixel values prior to projection.

U.S. Pat. No. 6,733,138 describes a system of forming a mosaic image from multiple projectors by projecting registration images from each to form a union registration image. This registration image is then used to generate a projective matrix, which is used to warp individual source images to achieve a unified composite image. The brightness from each of the projectors is weighted in the overlap regions to minimize seam visibility.

U.S. Pat. No. 6,804,406 describes a composite image display method using display to screen and screen to camera spatial transformation functions as well as a spatial luminance transfer function to pre-warp image segments prior to projection. An inverse of the spatial luminance function is used to blend colors in the tiled composite image.

U.S. Pat. No. 6,814,448 discloses a composite image display system which uses test images and means of sensing to determine correction data that is used to provide for a uniform level of illumination, overlap regions included, across the entire display screen surface.

All of these tiling techniques use various combinations of optical and electronic image correction to ensure that the overlapped region is indistinguishable from non-overlapped regions. Electronic image correction sacrifices the number of bits available to display images (bit depth) because some of the available image bits are used to correct for non-uniformities in brightness and color. In order to correct for brightness, color mismatches and spatial misalignments of pixels between the projectors a calibration technique, which measures the image on the screen to determine the required correction must be employed.

Conventional methods to achieve tiling require warping of images from every projector in the system. Each projector carries its own set of distortions that need to be eliminated in order to prevent artifacts near or within the overlap region. The removal of all distortions requires a mapping onto absolute screen coordinates, which is done through analytic expressions.

In the process of equalizing brightness and color between the two projectors, the output from each color channel must be adjusted. This adjustment is subtractive and leads to a lower light output of the combined system. These displays that use tiling must be frequently recalibrated primarily due to the reduction in brightness or changes in color that occur as the lamps age.

As well, these patents listed above do not address the unique requirements of projecting 3D stereoscopic motion picture images. Foremost 3D projection requires two separate and coded channels of image data to be projected, one for each eye's (left and right) point of view. In a tiled system the only way to achieve separate left and right eye images without modification of the system is to multiplex left and right eye images in time. As such the display duration of each frame is halved with the first portion devoted to displaying left eye images and the second portion for displaying right eye images. While this approach is possible, in one implementation, it requires expensive alternate eye shutter glasses to be worn by audience members. The need for alternate eye glasses can be eliminated with the use of a fast acting polarization converting element to switch the polarization of images for the right and left eyes thus allowing passive polarizing glasses to be worn by the audience, see for example, U.S. Pat. No. 4,281,341. Whether alternate eye shutter glasses are used or a fast acting polarizer is employed, time multiplexing the left and right eye images sacrifices brightness. As well, these methods place a higher demand on the electronic projectors to show content at faster frame rates and results in a reduced bit depth of the projected images.

There are also alternative approaches to project 3D in a tiled projection system that would require modification to placement of images on the screen. In the case of a two projector system, this would require that the output of the two projectors be fully overlapped. A passive 3D technique may then be used (polarizers or color filters) to separate left and right eye images. However, converting a system that requires images to be tiled for 2D operation and overlapped for 3D operation within a short time period time between 2D and 3D motion picture screenings would be complex and cost prohibitive.

A preferred approach for combining the output of two or more projectors used for 3D and 2D presentations is to completely overlap the two images. When images are completely superimposed, differences in brightness and color between the two projectors do not appear as local discontinuities that are readily detectable by the human eye. As such, a completely superimposed image does not suffer the loss in image bit depth and brightness incurred in a tiled display to achieve the required uniformity and does not require calibration to ensure overlapped and non-overlapped regions are indistinguishable. In a fully overlapped system the only calibration that is required is the measurement of the spatial distortions that cause pixel misalignments among the pixels projected from different projectors. A projection system that superimposes images is thus more robust due to insensitivity to changes in brightness and color of the images that occur as the system is used.

The following patents discuss various embodiments of fully overlapped component projectors achieved by electronically warping the image data. U.S. Pat. No. 6,456,339. In one embodiment of this patent, the images of two projectors having a small pixel fill factor are completely overlapped to produce a super resolution display. U.S. Pat. No. 6,222,593 describes an embodiment where their warping system is used to superimpose two images that may be used to increase 2D light levels or may be used for 3D applications.

U.S. Patent Application No. 2004/0239885 discloses a super resolution composition method that uses a derived projector correspondence map to a target surface. All component images are warped to the target surface and then an algorithm working in the spatial frequency domain optimizes the image quality. This optimization process depends on the image being displayed and is iterative malting it unsuitable for real time motion picture projection.

The following patents describe methods for increasing the resolution of a display by superimposing with a half pixel offset between the component images without warping the images electronically. Offset may be defined to be a vector displacement with two orthogonal components.

U.S. Pat. No. 5,490,009 discloses a method of enhancing the horizontal and/or vertical resolution of a display device by simultaneously combining the output of two or more offset spatial light modulators.

U.S. Pat. No. 6,222,593 is primarily focused on methods for tiling, but does mention the possibility of superposition of images to increase light levels and to allow the system to be used for 3D presentations.

U.S. Pat. No. 6,231,189 discloses a dual polarization optical projection system capable of 2D and 3D presentations in which separate component images are combined prior to projection through a single projection lens. The resulting images are fully overlapped on the projection screen and can be used to increase the brightness of the display, increase the resolution of the display by imposing a fixed offset of one image relative to the other of less than one pixel, or project stereoscopic images using the orthogonal polarization of the component images to distinguish left and right eye images.

Other patents, such as for example, U.S. Pat. Nos. 6,231,189 and 5,490,009, disclose methods to achieve higher brightness and resolution by superimposing projectors with a fixed sub-pixel offset relative to each other. In order to achieve the fixed offset when projecting on a curved screen, the images must be combined through a single projection lens as disclosed in U.S. Pat. No. 6,231,189. This negates the possibility of using off-the-shelf projectors. In addition, there are considerable challenges involved to mechanically register pixels with a fixed sub-pixel offset and maintain this offset over repeated use. In particular, when illuminating large screens the amount of light that must travel through the system results in thermal cycling that makes pixel registration more challenging.

To overcome challenges of maintaining a fixed sub-pixel registration required when combining multiple projectors to enhance brightness and increase resolution, certain patents or published patent applications such as, for example, U.S. Patent Application No. 2004/0239885 and U.S. Pat. Nos. 6,456,339, 6,814,448, and 6,570,623 disclose methods of image warping. These warping methods use a calibration method to measure the spatial misalignments between different projectors. These calibration methods calculate a correspondence map between the projectors and a screen co-ordinate system for warping the image data to correct for geometric distortions. The distortions result from optical or projection point differences among the projectors. The calibration methods disclosed work on the premise of being able to calculate absolute screen positions. Absolute screen positions are required to correct distortions caused by projection points that deviate significantly from normal incidence relative to the screen or where the intended application is sensitive to distortions. In order to convert images taken by a camera to absolute screen positions, the distortion of the camera and the relationship of the camera to the screen must be known. In these systems both images are warped to the absolute screen coordinates. If multiple cameras are used, then the calibration of the cameras to the screen must be extremely accurate in order to ensure correct warping of the images to achieve pixel registration. As disclosed in the prior art, this requires moving a physical test target across the screen surface. In a large cinema projection system this method of calibration is not practical.

The above patents do not address the needs that a motion picture cinema projection system must fulfill to be successful against competing display technologies. In particular, systems that requite the determination of absolute screen coordinates to superimpose images are unnecessarily complex and impractical to implement in a cinema theatre environment. They do not take advantage of the fact that, in a theatre environment, the image from a projector has relatively low distortion and may be projected essentially without modification onto the screen. This arises from the fact that the optical axis of the projection system is tear normal incidence to the screen in a typical theatre environment. In addition, an immersive cinematic experience requires a large field of view that can't be seen all at once. In this situation, distortions occur gradually relative to the viewer's gaze and are not noticeable.

There are additional requirements that are not easily met by existing art when the cinema projector must show both 2D and 3D presentations or when one presentation is a mixture of 2D and 3D formats. In some cases a custom projection system must be designed. In other cases, one must resort to using expensive shutter glasses or incur the light loss of 3D methods that use time multiplexing to distinguish left and right eye images.

Existing art does not take advantage of the different requirements of 2D and 3D presentation and the display properties required for an immersive experience. There is a difference between optimal brightness for 2D compared to 3D projection. In 3D projection a trade-off exists between brightness and perceived cross-talk between left and right eyes. Cross-talk occurs when a right-eye image leaks into the left eye or vise versa. This ghosting artifact is more apparent when the semen brightness is increased. As a result, the optimal brightness for 3D projection is generally lower than that required for 2D projection.

In addition to providing enhancements to the two modes of presentation, a successful system must also provide: a high quality of presentation in these modes; be cost effective; be easy to set up and calibrate; allow for a quick conversion from one mode to the other, and be easy to maintain.

The needs described above require a unique and optimal combination of the physical arrangement, calibration and mapping of the component projectors. This combination of elements is the subject of this patent and will be discussed in more detail below.

SUMMARY OF THE INVENTION

Embodiments of the present invention provide an electronic projection system that is capable of improving image fidelity by combining the output of multiple projectors by warping images to sub-pixel accuracy relative to a reference (master) projector. Embodiments of the present invention include methods and systems in which multiple projectors are configured in a master-slave relationship. The slave projector (s) images are warped to sub-pixel accuracy relative to the master projector to achieve higher light levels and improved image fidelity. Further differentiation is obtained by using these same projectors to display either stereoscopic (3D) motion pictures or enhanced 2D motion pictures.

In one embodiment of the present invention, the images of the slave projectors are homographically mapped to the master projector. This is distinct from conventional projection systems where all projectors are homographically mapped to absolute screen coordinates by means of a camera, which is homographically mapped to the screen. Unlike these conventional systems, one embodiment of the present invention does not attempt to get rid of all distortions of the master projector, but instead maps all slave projectors to match the image of the master projector. The relative warping disclosed in this invention greatly simplifies the system needed to achieve superposition of images to sub-pixel accuracy.

In an embodiment of the present invention, empirical data is used to achieve superposition to sub-pixel accuracy. Conventional projection systems are generally focused on removing all aberrations in the system by mapping to absolute screen coordinates. In order to achieve this mapping, analytic expressions are used by such systems to correct and remove the distortions in all the projected images. In contrast, one embodiment of the present invention uses a pixel correspondence map that is derived empirically to serve as the means for warping. An advantage of this method is that superposition to sub-pixel accuracy can be achieved even in regions where higher order distortions occur and analytical modeling is difficult. An example of such a distortion is the deformation of a vinyl screen when mounted upon a frame that is curved in the horizontal direction, in order to remove all creases, the vinyl must be stretched across the frame. This stretching causes the screen to deviate from a cylindrical shape. Furthermore the shape will change with time as the screen relaxes. By using an empirical method to achieve superposition, the ability to achieve sub-pixel registration is independent of the ability to model higher order distortions.

Briefly, according to one aspect of this invention, a projection system and method are described that optimally use two electronic projectors to provide both a 3D stereoscopic mode and a 2D projection mode of operation. Switching between these modes of operation can occur between presentations and within presentations. The two projectors are physically set up with their image fields substantially or completely overlapped. A camera is used to measure projected test patterns on the screen. The camera images are used to calculate a pixel correspondence map that maps the projected pixel location of one projector to projected pixel location of another projector with sub-pixel accuracy.

In a first embodiment of a 2D mode of operation, one projector is selected as a master and projects the source image without warping. This is advantageous due to the savings in computation that is significant for projecting motion picture presentations. As well, there is an image quality advantage in a system that does not require warping of the master image. Warping requires interpolation and can introduce artifacts into the image thus reducing image fidelity compared to an image that is not warped. The second projector (slave) projects an image that is warped to match the image from the master projector by selective sampling of the source image using the pixel correspondence map. The resulting composite image is twice as bright and exhibits an improvement in image fidelity due to a reduction in image artifacts as will be explained below.

In a second embodiment of a 2D mode of operation, the power of the projection lamps can be reduced to prolong the life of said lamps while still maintaining a screen brightness equal or greater to the brightness from a single projector.

In a third embodiment of a 2D mode of operation, the total overlapping of images is a means to provide a higher frame rate presentation using projection technology that would otherwise be considered too slow to do so.

In a fourth embodiment of a 2D mode of operation, the master projector projects a pre-distorted image so that the resultant image on the screen is free of first order distortions. Examples of first order effects are keystone distortion and barrel or pincushion lens distortion. As per other 2D embodiments, the slave projector(s) are warped to sub-pixel resolution to match the master projector image.

In the 3D mode of operation, the second eye of the stereoscopic pair is warped to match the first eye to eliminate the need for high precision optics to match left and right eye image sizes. Failure to match image sizes results in distortions that degrade the stereoscopic effect and may lead to eye fatigue.

In a second embodiment of a 3D stereoscopic mode of operation, each electronic projector combines three separate color channels, two of which have one polarization orientation with the third having an orthogonal orientation of polarization, into a unified beam of light. This is a common output polarization configuration for a liquid crystal based modulator system where the color channels are combined through a polarization sensitive x-Cube. The polarization states of all the channels in the two projectors are rendered orthogonal to one another by a suitable optical means. In so doing, one color channel in the second projector has identical polarization to the two complementary color channels in the first projector. The remaining three color channels from the two projectors have identical polarization states that are orthogonal to the first three. The color channels having identical polarization are combined to form a the stereoscopic images, one for each eye. Because each eye's image is a composite image with two color channels from one projector and a third from a second projector one of the components must be warped, using the pixel correspondence map, so that there is an accurate overall registration of the color channels. This color dependent warping technique eliminates the need for additional polarizers or polarization converting elements, which introduce light loss and changes in color.

BRIEF DESCRIPTION OF DRAWINGS

These and other features, aspects, and advantages of the present invention are better understood when the following Detailed Description is read with reference to the accompanying drawings.

DETAILED DESCRIPTION

Figure 1:
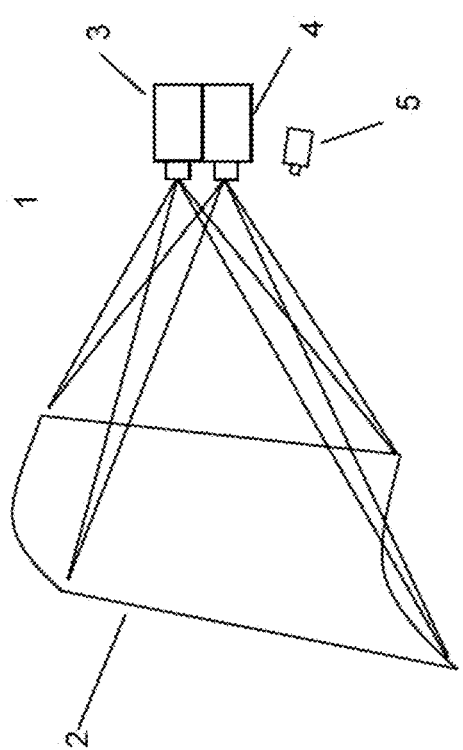
FIG. 1 is a schematic showing the overall components of the projection system according to one embodiment of the present invention.

Referring to FIG. 1, a convertible projection system (1) is shown composed of two separate electronic motion picture projectors (3, 4). Other embodiments of the projection system may contain more than two electronic motion picture projectors. The projectors are not limited to a particular electronic technology and may in fact be based on DMD (deformable mirror device) technology, LC (liquid crystal) reflective or LC transmissive technology, or any other existing or emerging electronic projection technology. In FIG. 1 the two projectors (3,4) are shown in their preferred embodiment of one placed above the other; however they may also be arranged in other positions relative to one another. The two projectors, regardless of their physical arrangement, project their images onto a projection screen (2) so that they are substantially superimposed or overlapped.

In other embodiments, more than two projectors may be used. For example, more than two projectors superimposed to project onto a single area. Alternatively, another embodiment includes both tiling and superposition where any point on the screen is illuminated by at least two projectors.

Figure 2:
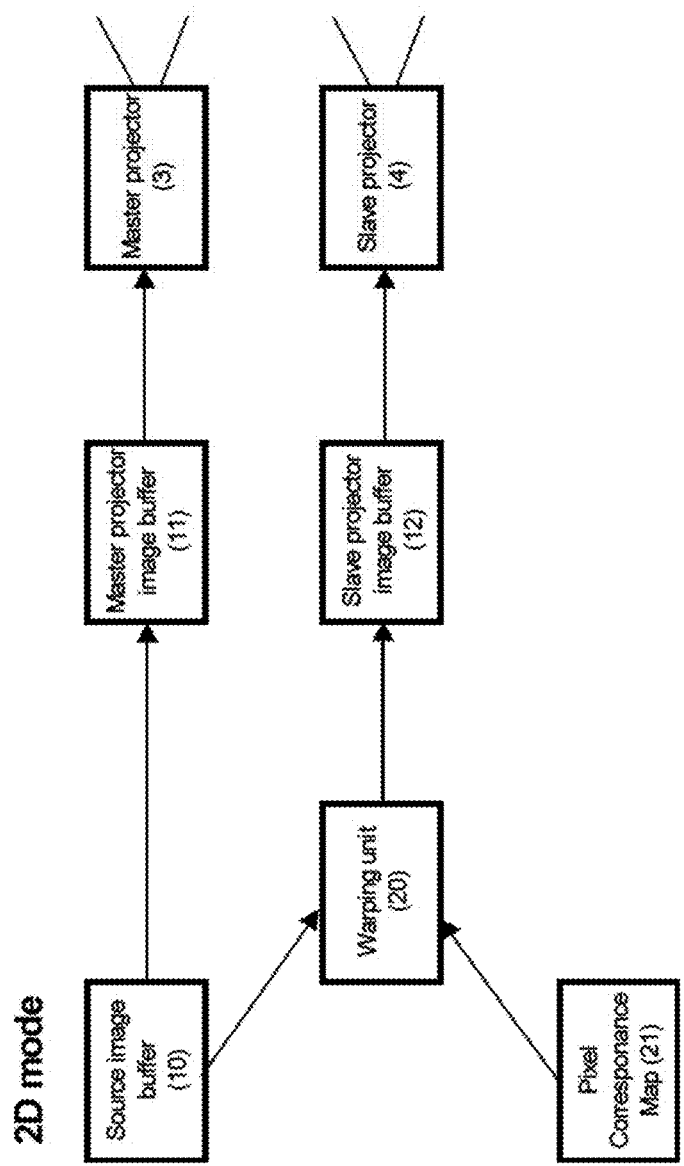
FIG. 2 is a schematic showing the operational flow of image data in the 2D mode of operation according to one embodiment of the present invention.

An alignment camera (5) is positioned to record test images projected by both projectors (3,4) onto the screen (2) to calculate the pixel correspondence map (FIG. 2, 21) used by the warping algorithm in the warping unit (FIG. 2, 20). Once the two projectors (3,4) are physically positioned and correspondence map (FIG. 2, 21) calculated, the projection system (1) can be rapidly and easily switched from 2D and 3D modes of projection by simply changing the electronic data sent to the projector. As stated above, color and brightness changes that occur as the system ages do not have any first order effects on image quality for 2D presentations. For 3D presentations, the brightness of the projectors must be matched to ensure high quality presentations.

The embodiment as shown in FIG. 1 uses a single camera for calibration. However, other embodiments may use multiple cameras to serve the same function.

Re-calibration of this preferred embodiment is only required when the relative position of the projectors (3,4) to the screen (2) is changed. This may occur due to a physical movement of the projector or due to a change in screen position. Changes in position of the image on the screen can be caused by changes in the optical path or modulator positions. The immersiveness of the presentation is enhanced by curving and tilting the screen towards the audience. Screens are normally made of vinyl that is stretched over a frame located at the perimeter of the screen. The position of the screen may change over time as the vinyl stretches and sags.

Figure 3:
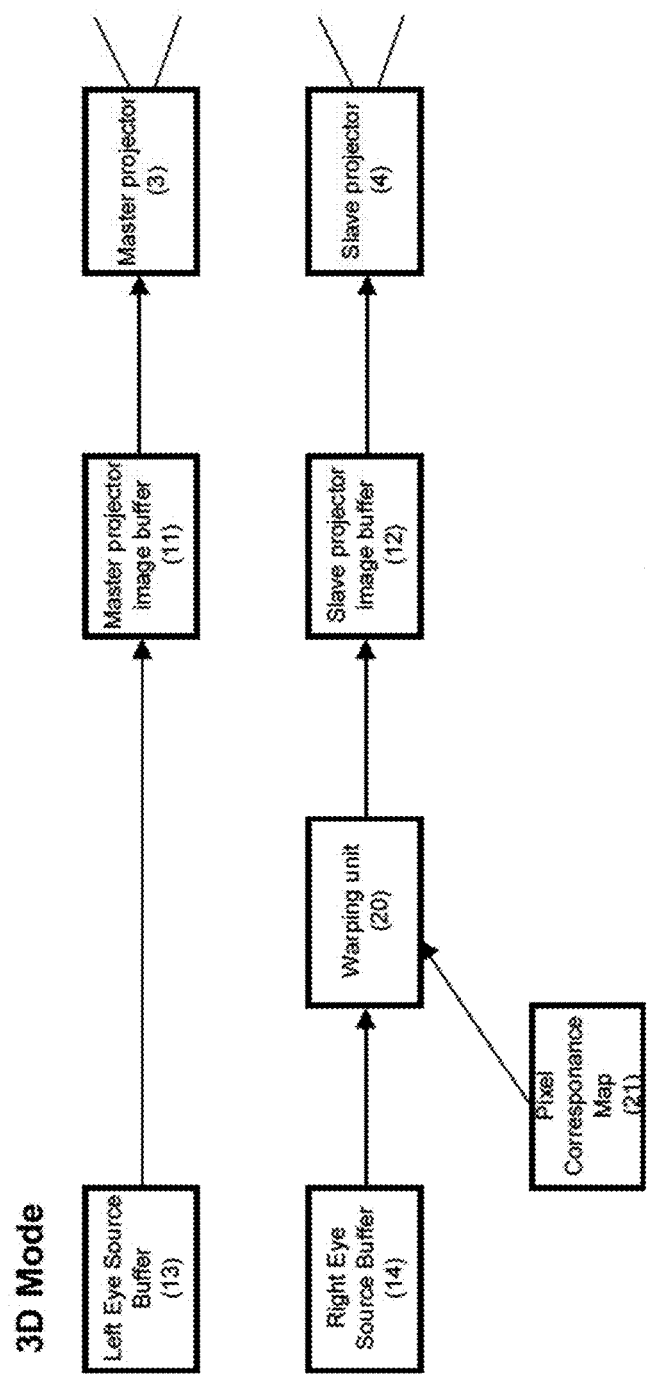
FIG. 3 is a schematic showing the operational flow of image data in the 3D mode of operation according to one embodiment of the present invention.

FIGS. 2 and 3 illustrate schematically the flow of imago data from storage to projection for each projector in both the 2D and 3D stereoscopic modes of operation. In the 2D mode shown in FIG. 2, a single source image buffer (10) contains source image data for one image that is to be projected on a projection screen for viewing by a theatre audience. Source image data buffer (10) is continuously being refreshed by new images at a suitable display rate, typically 24 frames per second, from an external image storage unit not shown. Image data from source image data buffer (10) is transferred simultaneously and in parallel to a master projector image data buffer (11), and to an image warping unit (20). The warping unit (20) warps the source image data in accordance with a pixel correspondence map (21) generated in calibration process (as described below and shown in FIG. 8). Once the source image has been warped by the warping unit (20), it is transferred to a slave projector image buffer (12). Then the image data in the buffers (11,12) are simultaneously transferred to the projectors (3,4) for projection on to the screen. The images are substantially or completely overlapped. The slave projector image is warped with sub-pixel accuracy to match the master projector image. The composite image on the screen is without noticeable defects and exhibits an improvement in image quality over that which would result from only one of the projectors being used. In particular the composite image will exhibit superior brightness and an improvement in image fidelity due to a reduction in image artifacts for superimposed images. If the increased brightness on the screen is in excess of what is needed to achieve the desired presentation quality, the power of the projection lamps can be reduced to prolong their life and reduce operating costs.

FIG. 3 shows image data flow in the 3D stereoscopic mode of operation. In this mode each projector has a unique source of image data one set of images corresponding to left eye images and the other to right eye images. A source image buffer (13) transfers the left eye image data to a master projector image buffer (11) where it is stored temporarily pending transfer to the master projector (3). A separate source image buffer (14) transfers right eye image data to a second image buffer (12) via the warping unit (20) where it is stored temporarily until both it and the master image in buffer (11) are transferred to projectors 4 and 3 respectively and then projected onto a screen to form a single 3D image. The warping is done on one of the images to eliminate the need for high precision optics needed to match left and right eye image sizes. The output from projectors 3 and 4 are coded (not shown) so that only left eye images are seen by the left eyes of audience members and only right eye images by their right eyes. Common coding techniques include, but are not limited to, polarization, time multiplexing and color.

Figure 4:
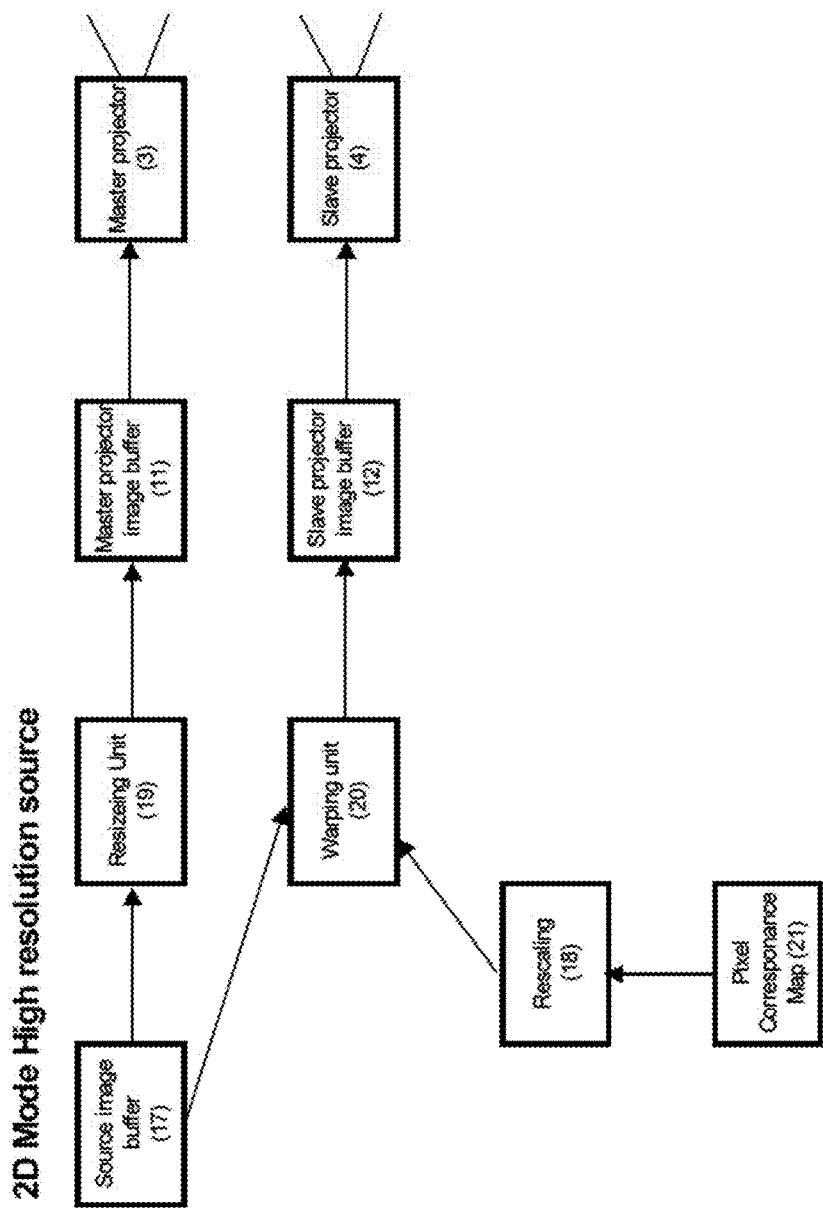
FIG. 4 is a schematic showing the operational flow of image data when a high resolution source is used to project 2D images according to one embodiment of the present invention.
Figure 5:
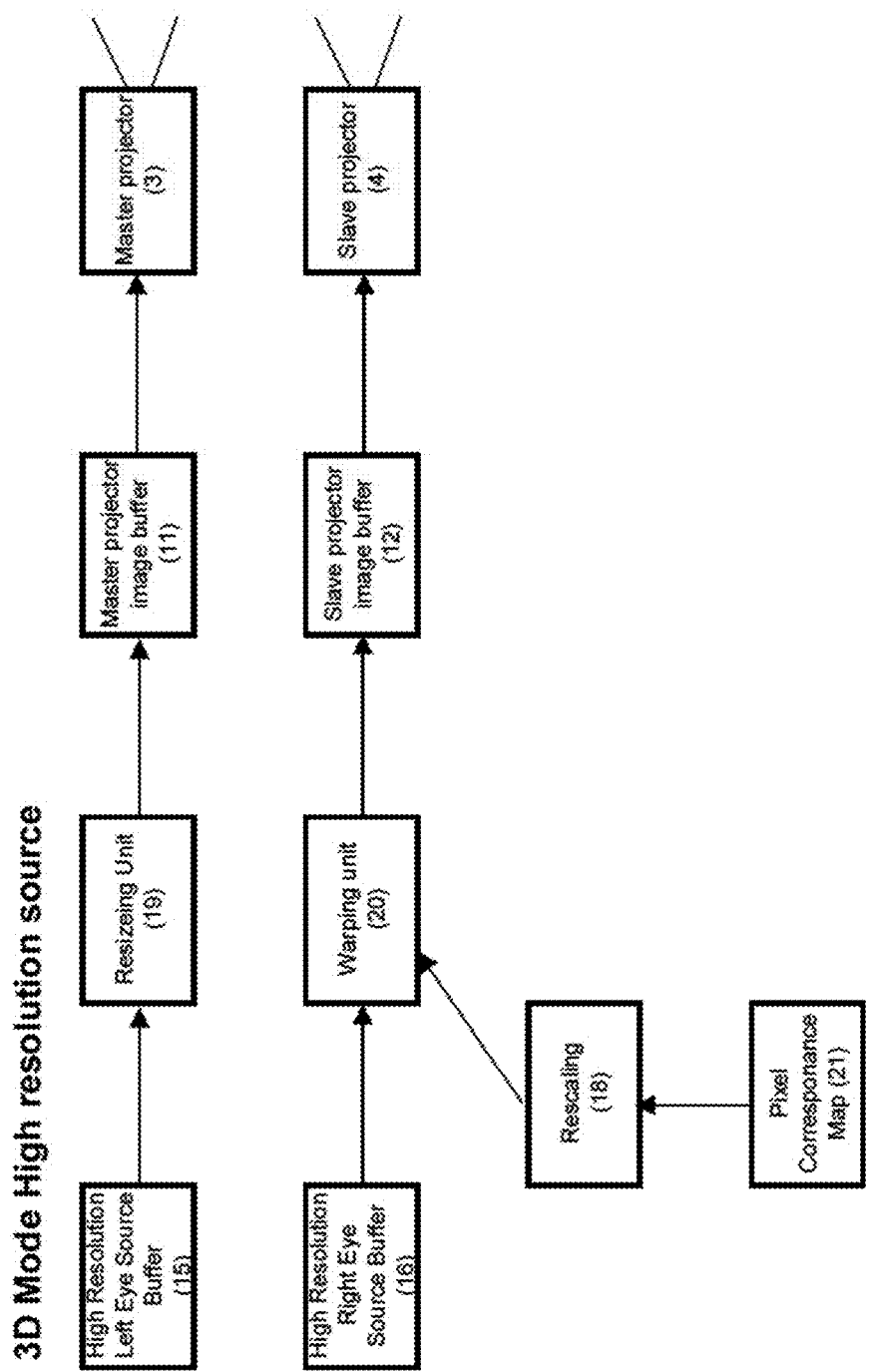
FIG. 5 is a schematic showing the operational flow of image data when a high resolution source is used to project 3D images according to one embodiment of the present invention.

FIG. 4 illustrates a second embodiment of the 2D mode of the invention where the source image data is provided at a higher resolution (17) than what either of the two projectors can project. This data is resized (19) for the master projector (3) to match the desired display resolution of the projector. The pixel correspondence map (21) is re-scaled (18) to match the high resolution source. This high resolution pixel correspondence map is used by the warping engine (20) to sample the source image data for the slave projector. The output of the warping engine (20) is matched to the resolution that the projector can project. The resulting composite image projected on the screen may have, a higher fidelity because of the image quality improvement that occurred as a result of resizing projected image data from higher resolution source data. FIG. 5 shows the 3D mode of this embodiment.

Figure 6:
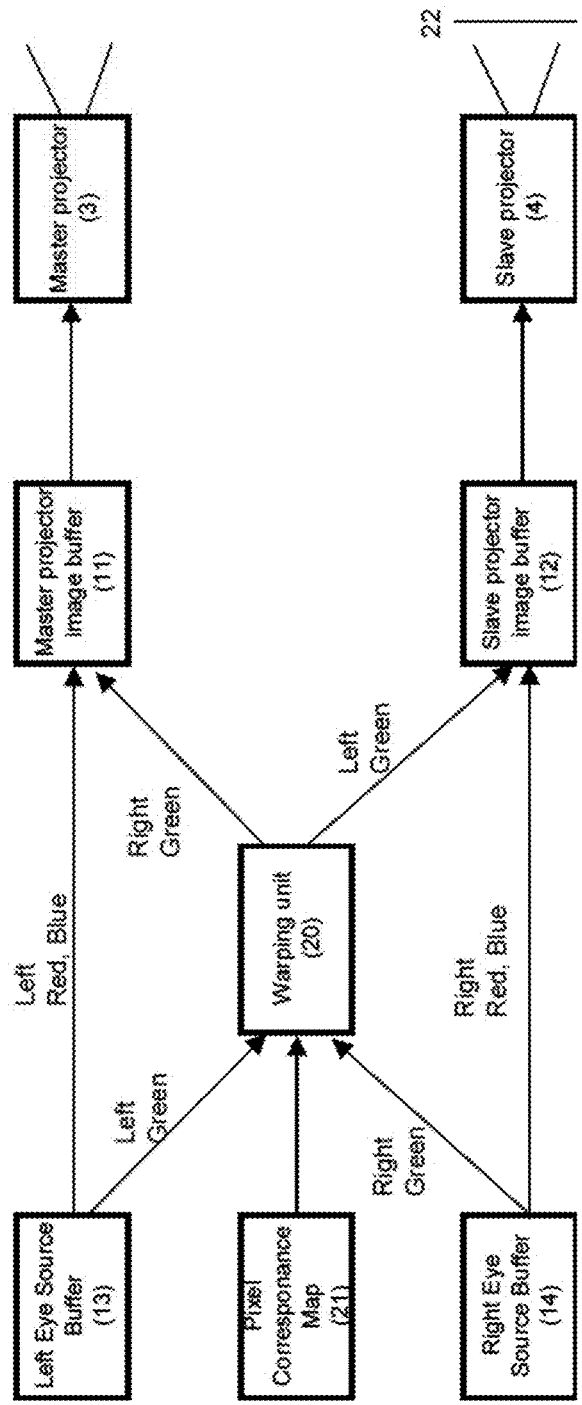
FIG. 6 is a schematic showing the operational flow of image data in the alternate 3D mode were color channel have different polarizations according to one embodiment of the present invention.

FIG. 6 depicts the second embodiment of a 3D mode of operation of the inventive system for use with electronic projectors that use orthogonal polarizations to combine the three separate color channels (usually red, green and blue) into one composite beam for projection. In this type projector the output light has one color channel polarized orthogonal to the other two. If the 3D mode of the first embodiment were used with this type of projector the images seen by viewers would be scrambled. One color from the right eye image would be visible in the viewers left eye, while one color from right eye image would be visible in the left. This scrambling would destroy the stereoscopic effect.

In this second embodiment, a polarization converter (22) is positioned within the optical path of projector 4; in this case it shown between the projector and the screen. This converter (22) changes the polarization of all of the component color channels of projector (4) into an orthogonal polarization state to the respective component colors from projector (3). Those skilled in the art will realize that the converter (22) is a ½ wave plate. Alternatively ¼ wave plates with suitable orientation of their fast axes may be placed in front or within each of the projectors to achieve the same result. Further, the projectors themselves may be designed to emit light that is orthogonal in polarization.

Without loss of generality, assume, for example, that it is the green channel that is orthogonally polarized to the red and blue channels. In FIG. 6 the green color channels of both the left and right eye image data source buffers (13, 14) are transferred to a warping unit 20. The red and blue image data is transferred directly from the source buffer (13) to the projector buffer (11) for the left eye image data and between buffer (14) and buffer (12) for the right eye image data. The right eye green image data is warped using the pixel correspondence map (21) so that when it is projected by projector (3) it will align spatially with red and blue channel projected by projector (4). The left eye green image data is warped using the pixel correspondence map (21) so that when it is projected by projector (4) it will align spatially with red and blue channel projected by projector (3). After warping the image data for the green channels are transferred to projector image buffers (11, 12) and combined with the red and blue channels of the opposite eye image data before being simultaneously transferred to the projectors (3,4). When the images are combined on the screen (2), the right eye image color channels will all have the identical polarization, while left eye image color channels will all have a polarization that is orthogonal to the right eye image.

A significant benefit of this second embodiment of the invention is that it overcomes the need to convert light from the master projector (3) into a single polarization state and convert light from the slave projector (4) into a single polarization state orthogonal to the projector (3). This conversion of polarization can be accomplished either through the addition of a polarizer which has the adverse affect of reducing brightness by approximately by a minimum of 50% because the polarization axis of the polarizer must be 45 degrees from the polarization states of the output light. Alternatively, a filter may be added that rotates the polarization of one color channel while leaving the other channels relatively unaffected. In this case, a polarizer may be needed to eliminate unwanted light to reduce cross-talk between left and right eye images. The addition of this clean-up polarizer between has the adverse affect of reducing brightness by approximately 15% and may require further losses to ensure white point accuracy and color uniformity across the screen are maintained. In the 2D mode of operation this second embodiment would operate in a similar manner as the first embodiment shown in FIG. 2. No special arrangements would be required to account for the different polarizations of the color channels because the viewers would not be wearing polarization sensitive glasses.

Figure 7:
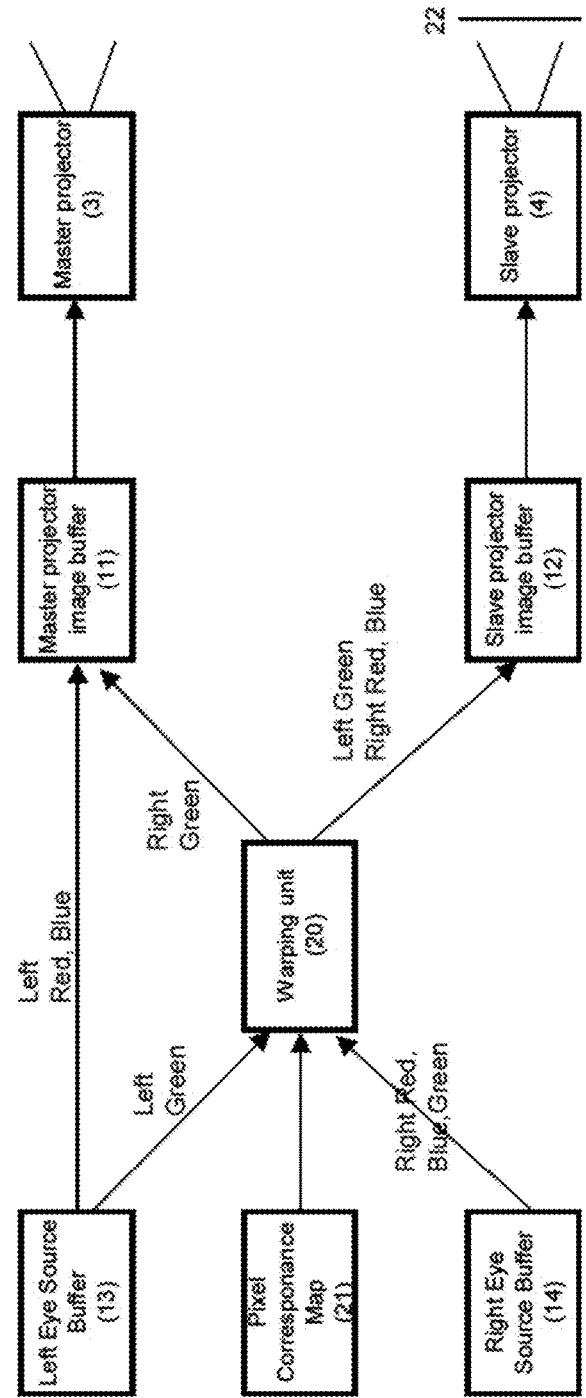
FIG. 7 is a schematic showing the operational flow of image data in the alternate 3D mode were color channel have different polarizations and all colors of the slave projector are warped according to one embodiment of the present invention.

The embodiment shown in FIG. 6 does not warp all the image information to the slave projector, hence, cannot correct: for aberrations in the slave projector lens relative to the master projector lens. FIG. 7 shows another version of this second embodiment of the invention. The difference in this case is that all of the color channels from the slave projector are warped in addition to one channel from the master projector eliminating the need for high precision optics required for projection. The ability to warp all colors of one eye image relative to the other eye permits the introduction of an offset on the screen between the two images in order to improve the performance of 3D presentations. Those skilled within the art will realize that are other versions of this second embodiment that are covered within the scope of this invention.

The various embodiments of this invention use similar components. It is possible to switch between 3D and 2D embodiments by simply changing the source images. To switch from a 3D mode to a 2D mode the source images would be duplicated in both source buffers or one source buffer would be turned off end one image would sent to all projectors as shown in FIG. 2. Switching back to a 3D mode would be the reverse process.

It is important to note that embodiments of this invention also include a Master projector, as shown in FIGS. 2 through 7, that pre-distorts images to lessen or eliminate first order distortions, such as keystone distortion and barrel or pincushion lens distortion, of the projected image. The pre-distortion may be achieved by preprocessing the source content or it may be a real-time correction that occurs in the electronic, data path of the Master projector. In one embodiment, the first order corrections to the Master projector's images is accomplished through an analytic description of the distortions. In a method identical to that previously described, the slave projector images are then warped to achieve sub-pixel registration with the Master projector images.

In any of the embodiments disclosed herein, there may be a need to modify the amount of warping to achieve accurate pixel registration between the Slave and Master projectors as the system warms up. Absorption of the light, as it propagates through the optical elements in the system, can cause slight changes in relative pixel locations of the Slave, and Master projectors. These changes are measurable and are found to be repeatable. In order to avoid waiting until the system reaches thermal equilibrium before presenting light on the screen, the pixel correspondence map can be updated, based on prior measurements, as the projection system runs in order to ensure accurate registration throughout the presentation.

In cases where the thermal effects are not completely predictable, dynamic changes in pixel alignment cause errors that can be compensated by updating the pixel correspondence map while the system is displaying 2D or 3D presentations. The map is updated by measuring test patterns that are adapted to be inserted in the presentation images using a method not easily detected by the viewers, such as placing the calibration points near the edge of the screen or making the points blend into the content. There are numerous means by which the calibration information may be embedded into the content many of which would require processing multiple frames to extract the calibration signal. This calibration information is not limited to the full array of dots that are used in the calibration prior to the presentation but may be a subset that allows one to correct for small changes in pixel positions across the screen as the presentation progresses.

In any of the embodiments disclosed herein the calibration camera (5) as shown in FIG. 1 may be used to calibrate other aspects of the projected image including color and luminance. With appropriate test patterns the camera may be used to measure absolute color and spatial variation in color of the image projected on the screen. The warping unit may have additional algorithms to use the measured color maps to correct the average color in any or all slave and master projectors, spatial variation in color in any or all the slave and master projectors or match the color of the slave projector to the master projector. Similarly, the camera may also be used to measure the absolute luminance of the image on the screen, the spatial variation of luminance or the difference in luminance between the projectors. The measured luminance maps may be used by the warping unit to electronically adjust the image data to change the average luminance of the projected image in any or all slave and master projectors, adjust the luminance distribution in any or all the slave and master projectors or match the luminance of the master and slave projectors.

Figure 8:
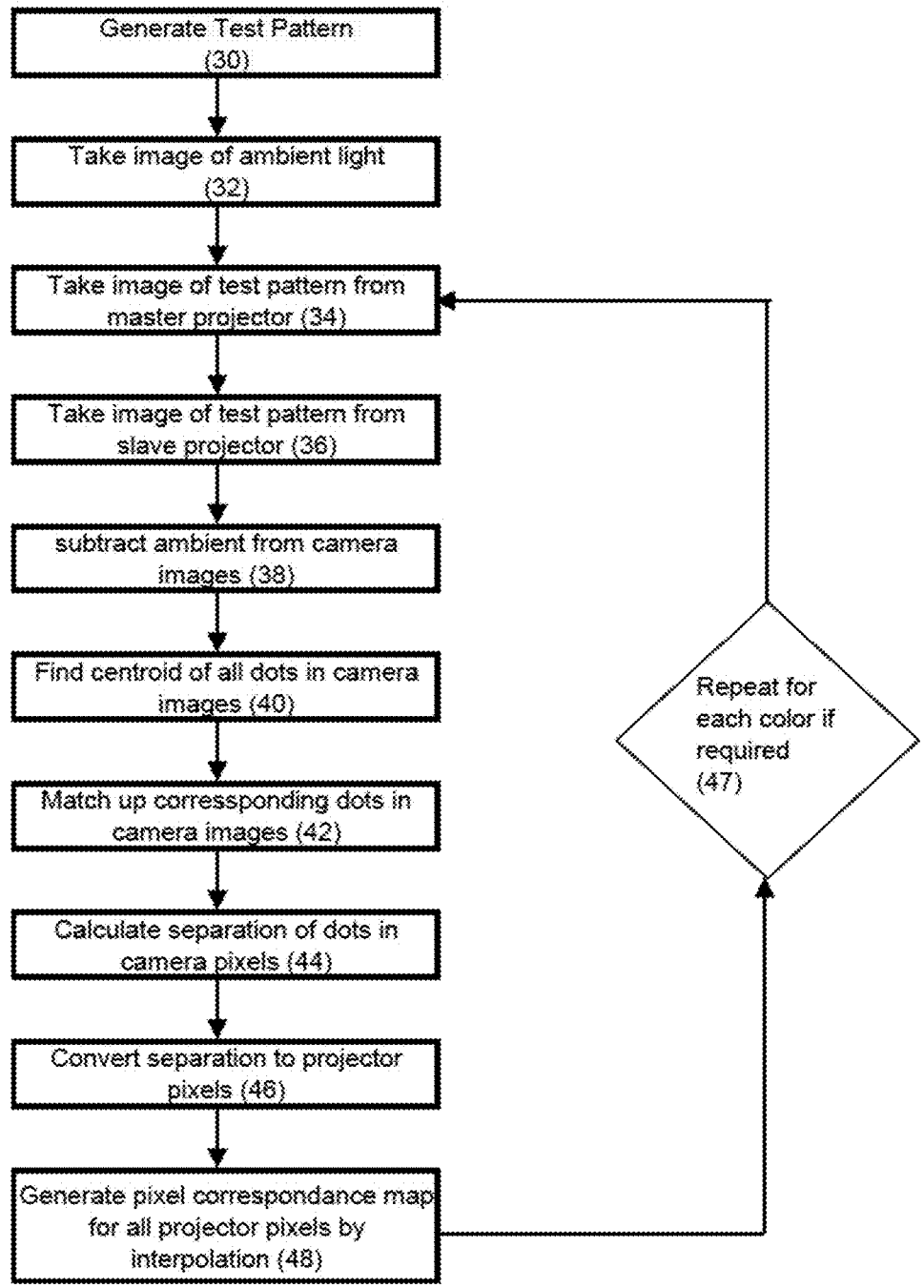
FIG. 8 is a flow chart showing the steps performed in generating the pixel correspondence map to warp one image into alignment with the other according to one embodiment of the present invention.
Figure 9:
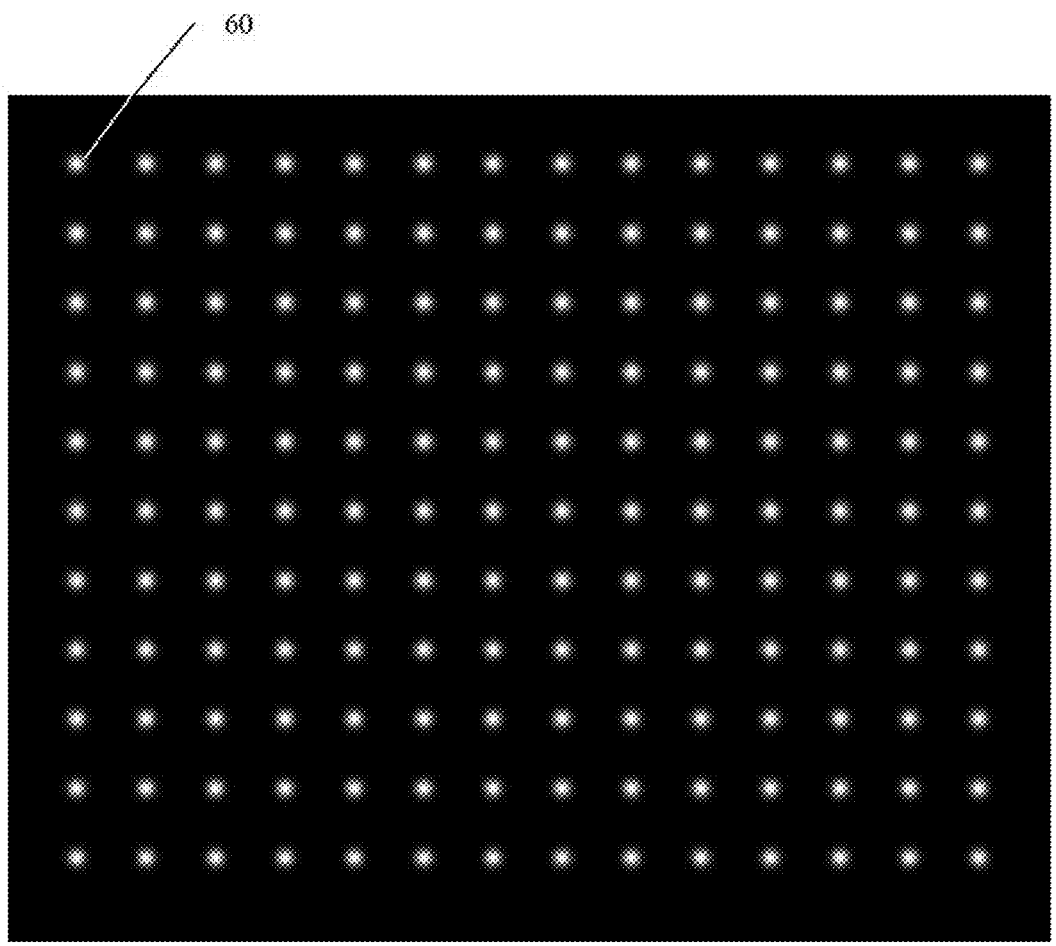
FIG. 9 is an example of a test pattern used for calibration according to one embodiment of the present invention.

FIG. 8 is a flowchart illustrating the steps performed to calibrate the pixel correspondence map (21) used by the warping engine (20) to warp images in various embodiments of this invention. The procedure measures the position of a pixel in an image from slave projector (4) relative to the corresponding pixel from the master projector (3). Corresponding pixels have the same index co-ordinates in the projector image buffers (11, 12). Step 30 involves generating a test pattern (FIG. 9) of a grid of dots (60), each several pixels in diameter, exhibiting a Gaussian luminance distribution. The calibration can be performed once with test patterns with white dots or it can be performed for each color channel of the projectors, in this case, three sets of test patterns are generated, one for each color channel. By repeating the calibration for each color, this invention overcomes lack of convergence between color channels that may occur as the system heats up under the high flux levels needed to illuminate a large screen or that may occur as the system is thermally cycled due to repeated use over time. Differences in convergence (alignment of the color channels in the projected image) between projectors will result in errors in the pixel correspondence map if each color is assumed to be the same. Repeating the calibration for each color eliminates these errors.

In step 32, an image is taken of the screen 2 with the alignment camera (5) with both projectors in an off state so that only ambient light not originating from the projectors is measured. Steps 34 and 36 involve taking an image of screen (2) with projector (3) and projector (4) displaying the test pattern (FIG. 9) respectively. In step 38, the ambient light image is subtracted from the images captured in steps 34 and 36 to eliminate the effect of ambient light. In step 40 the centroid co-ordinates of each dot in the test pattern projected by each projector is calculated in the camera image. The test pattern dots (60) cover multiple pixels in the camera image. As a result the dots centroid co-ordinates can be calculated with sub-pixel accuracy using a variety of methods. A simple method involves calculating the sum of each pixel's co-ordinates in the images of the dot weighted by the luminance of the pixel. Those skilled in the art will realize that there are other methods of calculating the centroids with sub-pixel accuracy, including fitting the camera pixels luminance values to the function used to generate the dot test pattern; in this case a Gaussian. Those skilled in the art will realize that other dot patterns may also be used to achieve sub-pixel accuracy.

In step 42 the centroids of the dots from one projector camera image are matched with the camera image of the other projector. In step 44 the offsets between these centroids, in camera pixels, are calculated by subtracting co-ordinates of the master projector dot centroid from the slave projector dot centroid. A conversion between camera pixel scale and projector pixel scale can be calculated by comparing the measured number of camera pixels between dots to the number of projector pixels between dots on the test pattern. This scale is used to convert the offsets into projector pixels in step 46. The pixel correspondence map 20 is completed in step 48 by calculating the offset for each projector pixel by interpolating between the offsets generated for each pair of test pattern dots. Steps 34 to 48 are repeated for each color channel if required.

Often the screens used in a 3D presentation will have a significant gain; i.e. screen is not Lambertian. The variation in brightness across this screen due to the high gain can pose a significant problem for the alignment camera (FIG. 1, 5), which is of limited dynamic range in sensing luminance. As well, the location of the centroid of each of the dots can be affected by screen gain thus leading to a slight error in the pixel correspondence map in the direction of increasing screen gain. To over come both of these problems, the illumination of the test pattern is adjusted to compensate for the variations in screen gain to make the image seen by the camera of uniform luminance. This reduces the dynamic range of the images taken by the camera allowing the entire screen to be imaged with a camera with a single exposure. In addition it removes the systematic error in the pixel correspondence map caused by the variation in screen luminance. Alternatively by knowing how the gain varies across the screen, this error may be fixed by accounting for the gain variation in the calculation of the pixel centroids.

Figure 10:
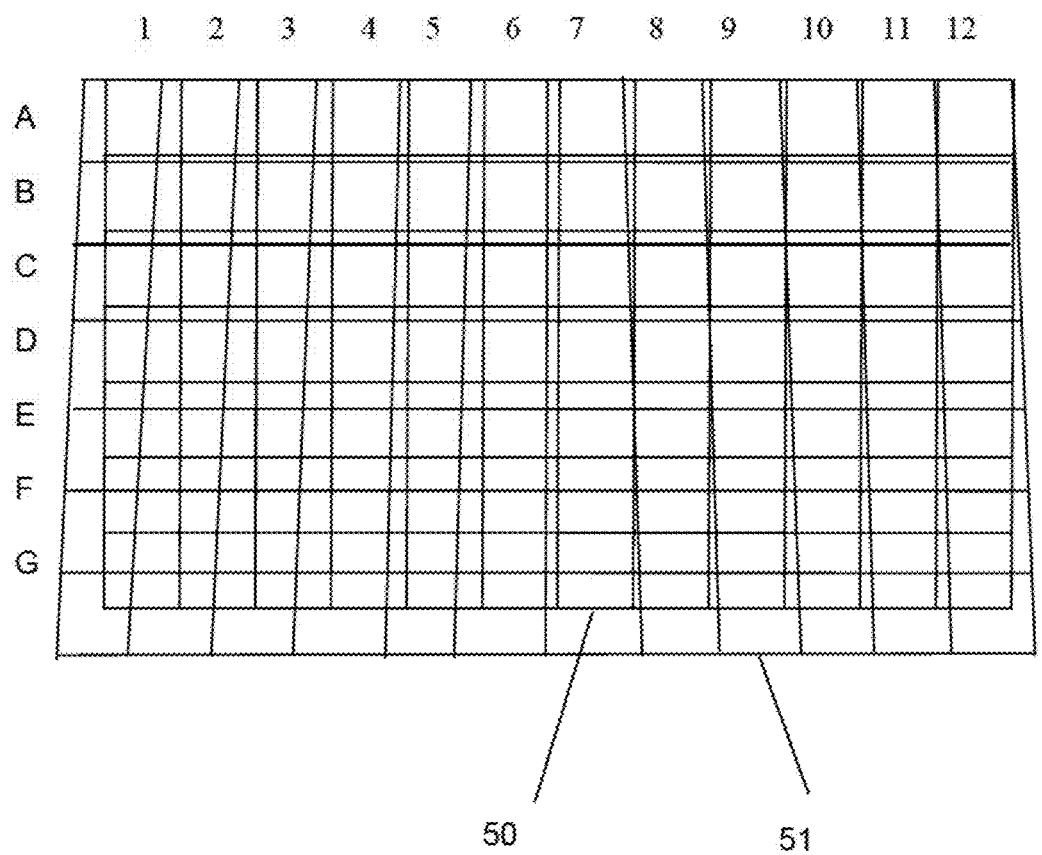
FIG. 10 is a schematic illustrating the relative and varying offset of one projected image with the other according to one embodiment of the present invention.

Referring now to FIG. 10, an array of pixels projected by the master projector is depicted schematically by grid 50. A second array of overlapping projected pixels from a second slave projector is depicted by grid 51. The second pixel array SI is shown having a varying horizontal and vertical offset from pixel array 50. This variability is typical of overlapping images projected from the two separate projectors. Alphanumeric indexing values are shown on the horizontal and vertical edges of the arrays to help describe how the second pixel array (51) is warped in accordance with the invention. Pixels projected from the slave injector are identified by the prime symbol (').

To illustrate the process of image warping, the image data value of a single pixel, D4' of the overlapping slave projector image (51), is discussed below. Pixel D4' shown to be offset relative to the master projector pixel D4 by a pixel width of approximately −0.1 pixel in the horizontal or x direction and −0.1 pixel in the vertical or y direction. These relative offset values would in fact be derived from the calibration process discussed previously and would be stored in the pixel correspondence map (20). Together the offset values and a sampling function to be described below serve to warp or transform the image so that it conforms more precisely to the image projected by the master projector. In other words the slave projector image data for each pixel is electronically shifted to compensate for the physical discrepancies in the overlap of the two images.

Figure 11:
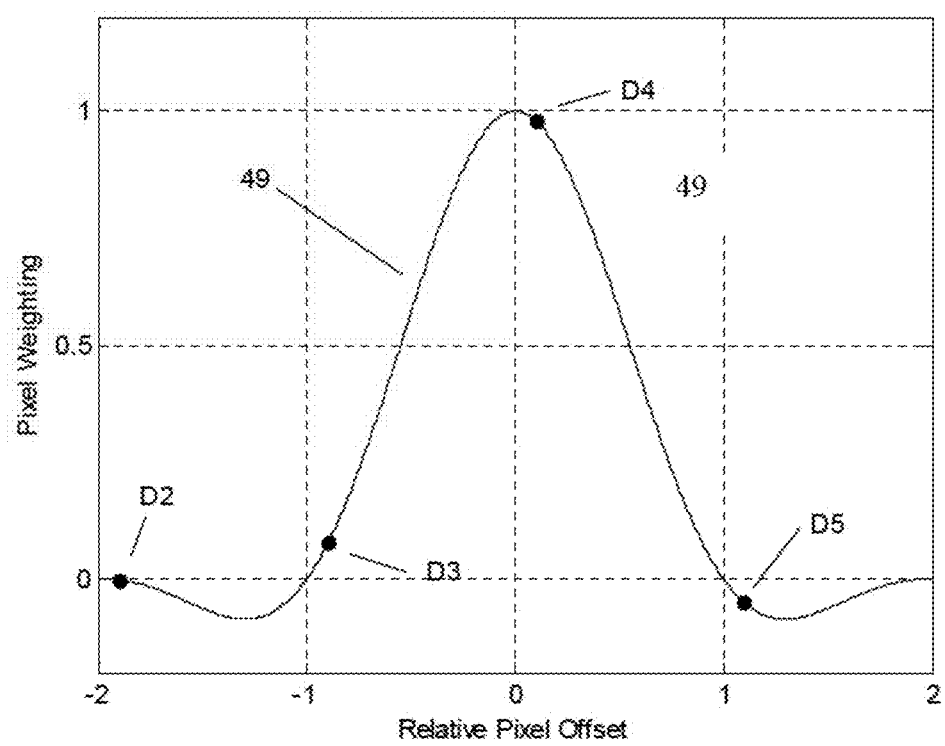
FIG. 11 shows an illustrative shape of one possible sampling function used to warp one image with respect from another using the pixel offset map according to one embodiment of the present invention.

The sampling function (49) is shown in FIG. 11. In a preferred embodiment the warping function is a Lanczos window function, but other types of sampling functions may also be effectively used. Warping sampling function 49 as depicted in FIG. 11 as one dimensional for illustrative purposes.

The points D2, D3, D4 and D5 on the sampling function refer to the relative contribution of each of those pixels in source image data (10), to warped pixel D4' calculated by the warping unit (20). The coordinate system in FIG. 11 represents the pixel position of the slave projector with origin at D4'. Note that the position of D4 in FIG. 11 shows the −0.1 pixel offset in the horizontal direction as shown in FIG. 10. Another pass of the sampling function (49) in the vertical or y direction is required to calculate the final image data for D4'.

Figure 12:
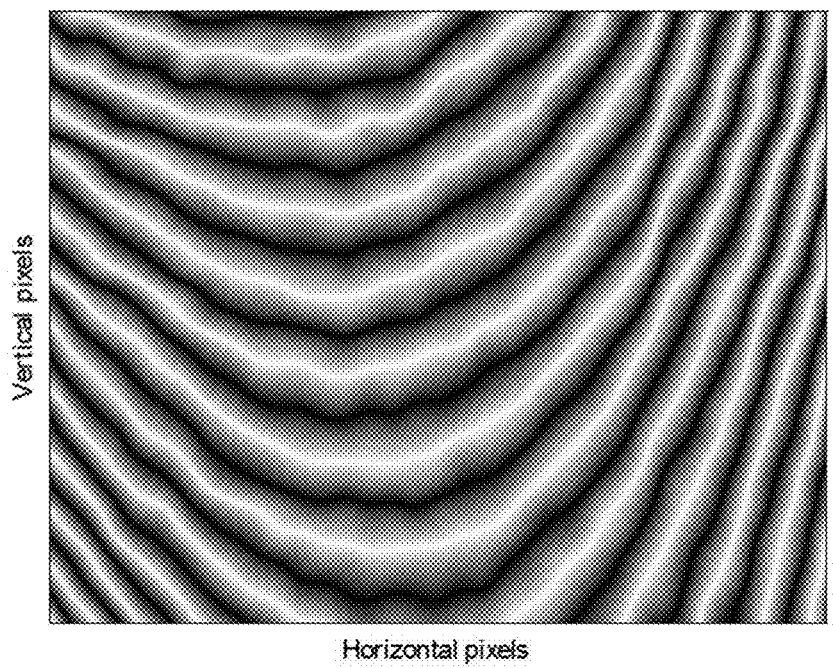
FIG. 12 shows an illustrative fractional pixel offset map as a function of screen position according to one embodiment of the present invention.

Since the offsets between the projector results from a number of different types of distortion (optics variation, projection point differences) the relative offset between pixels varies across the screen. FIG. 12 shows the fractional pixel offset, in the horizontal direction, between pixels on a flat screen from two projectors that are in rough alignment to one another. The fractional offset ranges from ½ pixel as shown in the white areas to 0 pixels as shown in the black areas. This image was created by taking the calculated offsets between the projectors and subtracting the integer pixel offsets. It is clear from this example that the image enhancement is not constant across the screen. If the two projectors were more carefully aligned and if the projection lenses were better matched to one another, the variation across the screen may be decreased. However, if the screen is not flat but curved the distinct projection points of the two projectors make it impossible to achieve a uniform offset across the screen even if the projectors are perfectly aligned and the projection lenses are perfectly matched.

Figure 13:
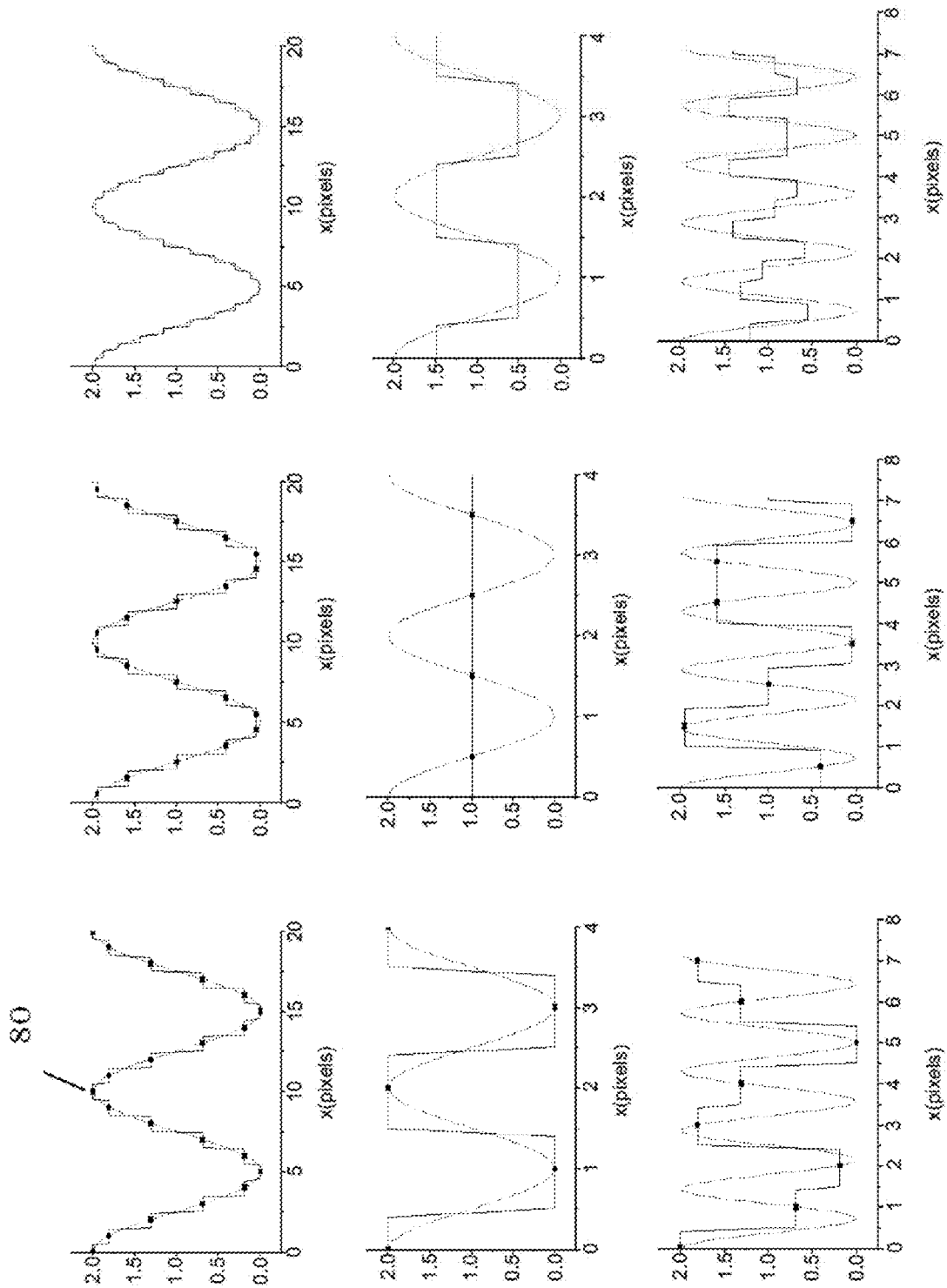
FIG. 13 shows illustrative plots showing pixilated output of single and superimposed projectors for sinusoidal input signals of different frequencies according to one embodiment of the present invention.

Now described in more detail is the increase in image fidelity when two projected images with an offset are superimposed, FIG. 13 shows, in one dimension, how a sinusoidal signal image is represented by sampled pixels that are projected by the projection system. In each sub-plot the horizontal axis represents pixel position and the vertical axis represents relative pixel illuminance. The top, middle and bottom rows of the sub-plots show the sampled response to a sinusoidal input signal at wavelengths of 10, 2 and 1.43 pixels respectively. The left, center and right columns of the sub-plots show the output of one projector, a second projector offset by ½ a pixel from the first and the superimposed output of the two projectors respectively. In the latter case, the resultant was divided by two to keep the results on the same scale. For descriptive purposes, the sinusoidal signal amplitude, shown as a dashed line in the plots, is taken to be unity. The signal amplitude at each pixel is obtained by taking the magnitude of the sinusoidal signal at the center of the pixel as is illustrated by the solid circles (80) in each of the plots. The solid lines represent the illuminance output of the projection systems. These solid lines show that the fill factor of each pixel has been assumed to be 100%; i.e. there are no gaps between the pixels.

The top row of FIG. 13 shows that for a signal frequency below the Nyquist limit of the sampling frequency, the sinusoidal input signal is well described by the pixilated outputs of the individual projectors. The superimposed projection system shown at the far right is seen to follow the input sinusoidal signal more accurately than either of the two individual projectors.

The middle row shows the results when at the Nyquist limit. Here, the projector output depends critically upon the phase of the sinusoidal signal relative to the sampled pixels. The left plot shows a maximum amplitude output when the pixels are sampled exactly in phase with the sinusoidal signal while the middle plot shows no variation in output when the pixels are sampled 90 degrees out of phase with the sinusoidal signal. Once again the plot at the right shows the response when the two projectors are superimposed.

The bottom row shows results when the frequency of the sinusoidal signal exceeds the Nyquist limit. Here it is clear that the lack of sufficient sampling for the single projector systems, shown by the plots at the left and the middle, leads to a poor representation of the original sinusoidal signal. However, when the outputs of these projectors are superimposed, as shown in the plot on the right, the increased amount of sampling yields an output that does a much better job of representing the original sinusoidal signal, albeit at a lower amplitude.

Figure 14:
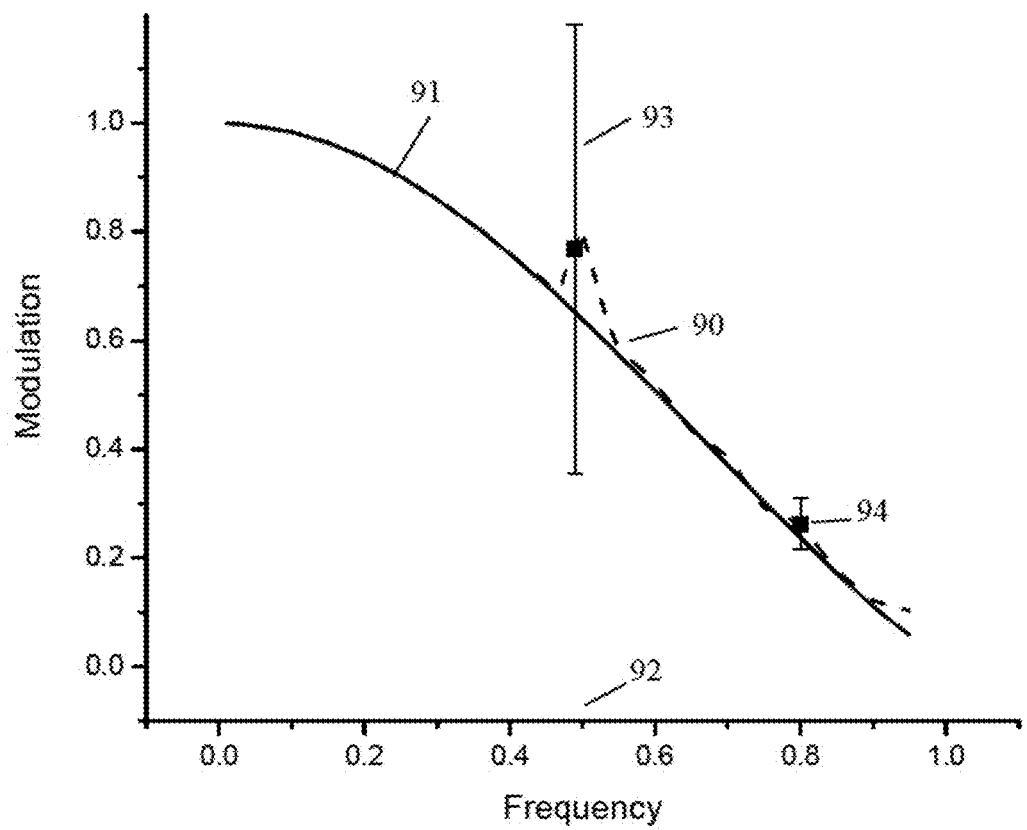
FIG. 14 shows an illustrative comparison of MTF for single and superimposed projectors with 100% fill factor according to one embodiment of the present invention.

FIG. 14 compares the modulation transfer function (MTF) of a single projector (90) and projection system consisting of two projectors superimposed with a ½ pixel offset (91). The graph shows the response of the system to sinusoidal modulations ranging in spatial frequency from 0 to 0.9 expressed in units of reciprocal pixels. It follows that the Nyquist limit (92) is given by a frequency of 0.5 in this figure. The MTF curves were calculated by determining the best fit sinusoid, at the same frequency as the input sinusoid, to the pixilated output signals examples of which are shown in FIG. 13. The best fit at each frequency was averaged over all phases of the input sinusoidal signal wave relative to the projector pixels. This allowed the determination of the average best fit amplitude reported in FIG. 14 and its uncertainty.

FIG. 14 also shows that the MTF of both the single projection system (90) and the one in which two images are superimposed (91) is very nearly the same except near the Nyquist limit (92). As commented in the description of FIG. 13, at the Nyquist limit the single projector system's output is strongly dependent on the phase of the sinusoidal signal relative to the pixels. The resulting uncertainty in amplitude is shown by the error bar (93) located near the Nyquist limit in FIG. 14. It may come as a surprise that this error bar (93) extends to amplitudes greater than the input frequency amplitude. This may be explained by looking back at the middle left plot of FIG. 13. A best fit sinusoidal signal, that minimizes the residual between the fit and the output from the projector, is of amplitude greater than the input signal.

As one moves away from the Nyquist frequency, the uncertainty of the amplitude decreases as is illustrated on the plot by the smaller error bar (94) at f=0.8 for a single projector. The fitted amplitude uncertainty for the system with two projectors superimposed is on average, an order of magnitude smaller than this error bar (94) over the entire frequency range including frequencies at or near the Nyquist limit.

Figure 15:
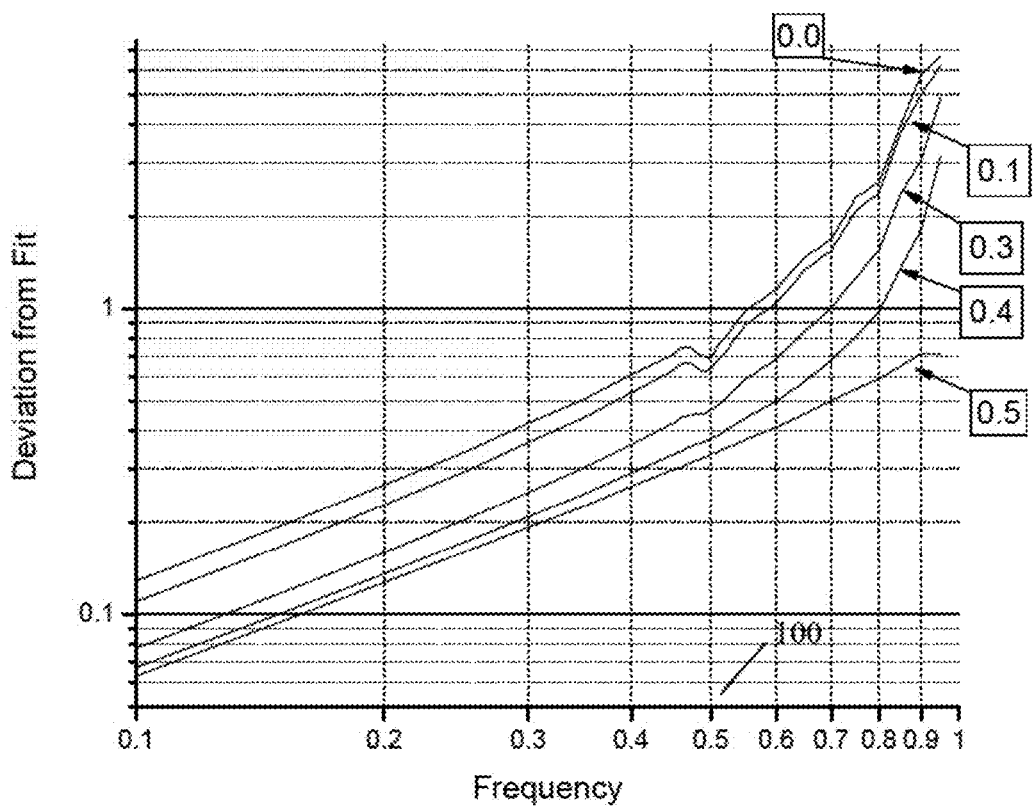
FIG. 15 shows illustrative artifacts as a function of spatial frequency for superimposed images with different offsets according to one embodiment of the present invention.

FIG. 14 does not show any improvement in MTF due to superposition of two projectors with 100% pixel fill factor however we must consider image artifacts in order to understand the benefits of superposition. Image artifacts may be quantified by determining how well the pixilated output from the projection system is fit by the sinusoidal function. The goodness of fit may be determined by the variance between the pixilated output and the sinusoidal fit. FIG. 15 shows a plot of the square root, of the average variance divided by the phase averaged amplitude of the fitted sinusoid shown in FIG. 14. Each line in the graph is labeled by the fractional pixel offset of one projector relative to the other. The largest amount of image artifacts is shown for the superimposed system with zero pixel offset between projectors (labeled 0.0). This is equivalent to the amount of artifacts from a single projector. The least amount of image artifacts is shown for the superimposed system with 4 pixel offset between projectors (labeled 0.5). Near f=1, the artifacts of this system are approximately 10× smaller than the zero pixel offset artifacts. At frequencies at and below the Nyquist limit (labeled 100), the artifacts are approximately 2× smaller than the zero pixel offset artifacts. The other lines on the graph show image artifacts for offsets of 0.4, 0.3 and 0.1 pixels are less than image artifacts with zero pixel offset.

Figure 16:
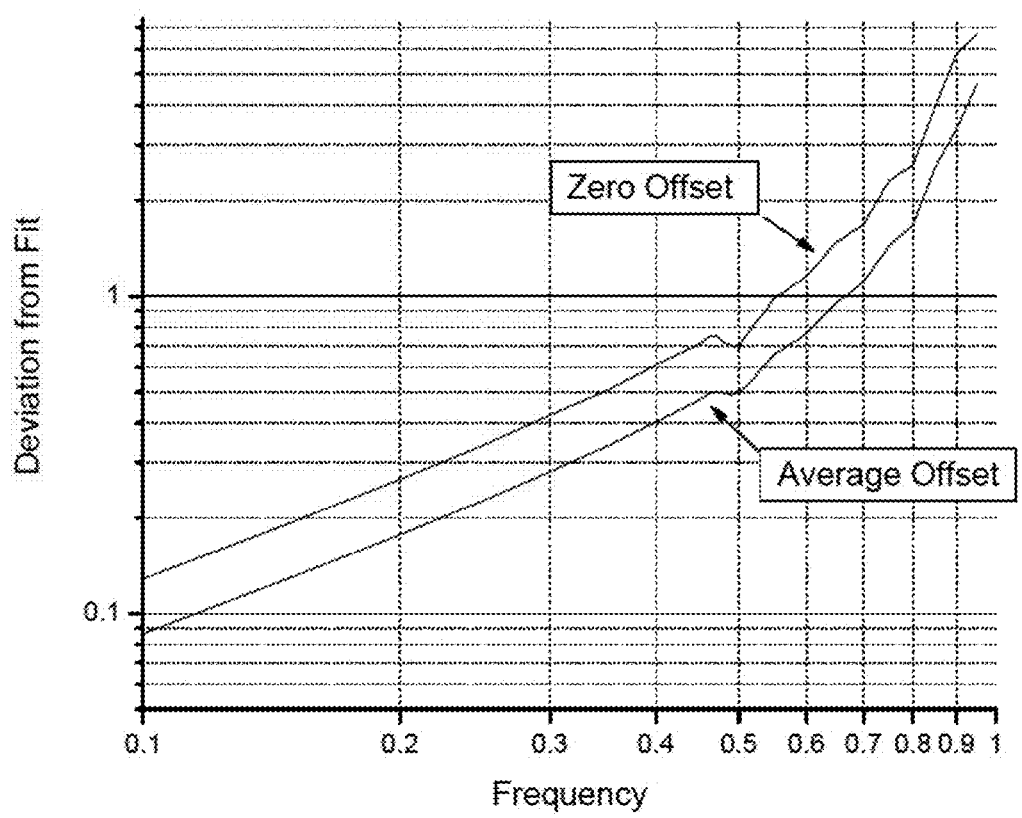
FIG. 16 shows illustrative artifacts from a single projector compared to artifacts from a system with superimposed images averaged over all pixel offsets according to one embodiment of the present invention.

Assuming superposition varies across the screen as shown in FIG. 12, it is reasonable to argue that the average performance may be obtained by averaging the improvements over all possible pixel offsets. FIG. 16 shows this average performance compared to that of a single projector. Here it is seen that the artifacts are 27 to 42% less than the artifacts from a projection system with zero pixel offset.

Warping the slave image as described above and superimposing it with the master image improves the image fidelity due to a reduction in image artifacts. This enhancement results from the pixels from one projector being offset from the pixels of the other projector and image warped to fill in the appropriate pixel value. The enhancement is a maximum when the offset is ½ pixel and a minimum at 0 pixel offset as show in FIG. 15.

The discussion above has been for a system in which the pixels have a 100% fill factor. When pixels have a low fill factor such as is disclosed in U.S. Pat. No. 6,456,339, the mechanism by which resolution is increased is distinct from the improvement in image fidelity that we have considered above. When multiple projectors are superimposed and positioned such that the pixels of one projector emit light within the gaps between pixels of the other projector, a true increase in resolution occurs. In the particular case where two projectors are superimposed with the pixels of one projector half way between those of the other projector, it is not hard to see that there is a doubling of the Nyquist limit and resolution of the system. The invention disclosed here deals with the more subtle increase in perceived resolution or image fidelity that occurs for systems with high fill factors where the light output from the pixels overlap regardless of what offset exists. This transition occurs at fill factors greater than 25% where the size of the pixel is greater than 50% of the interpixel distance.

An additional benefit is possible when projected images can be made to accurately overlap each other. By overlapping higher frame rate images projected from two or more slower responding projection systems (such as LCD projectors) it is possible to get a higher frame rate presentation without the degradation artifacts associated with slower responding projection systems. This may be achieved while maintaining or improving overall image brightness.

Figure 17:
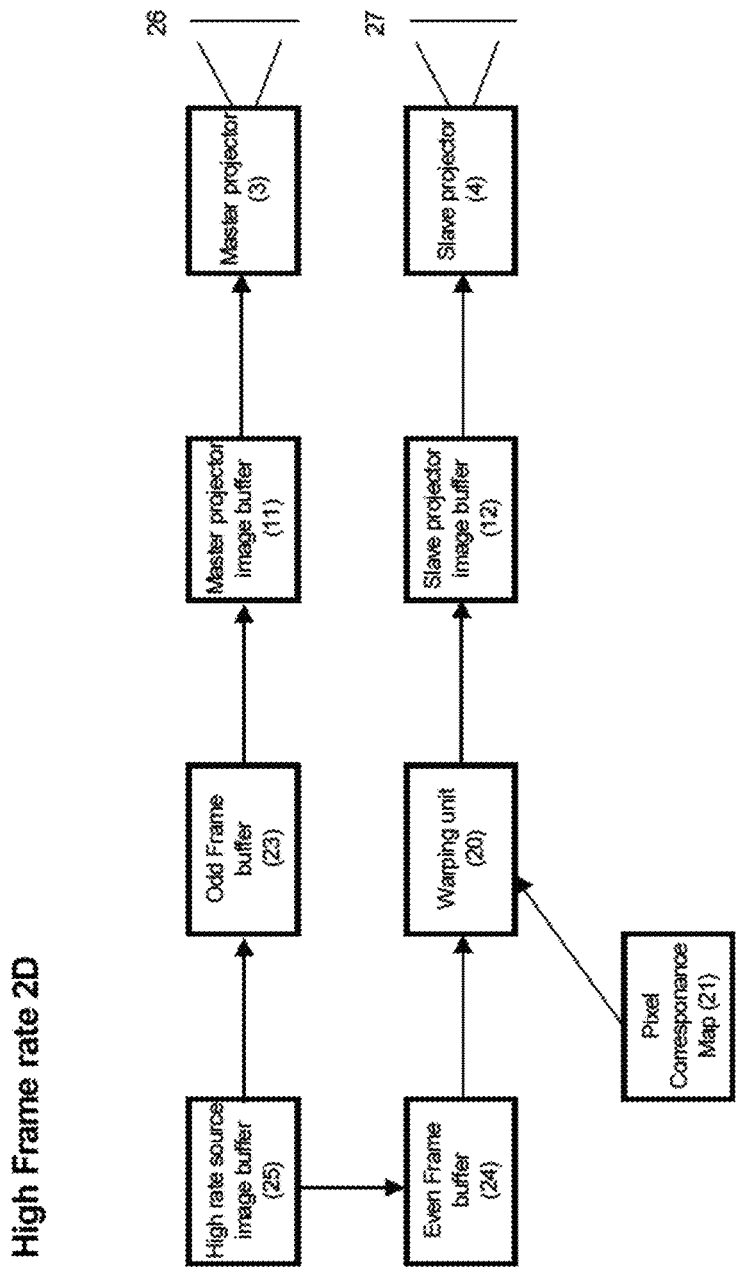
FIG. 17 shows an illustrative operational flow of image data when a high frame rate mode is used according to one embodiment of the present invention.
Figure 18:
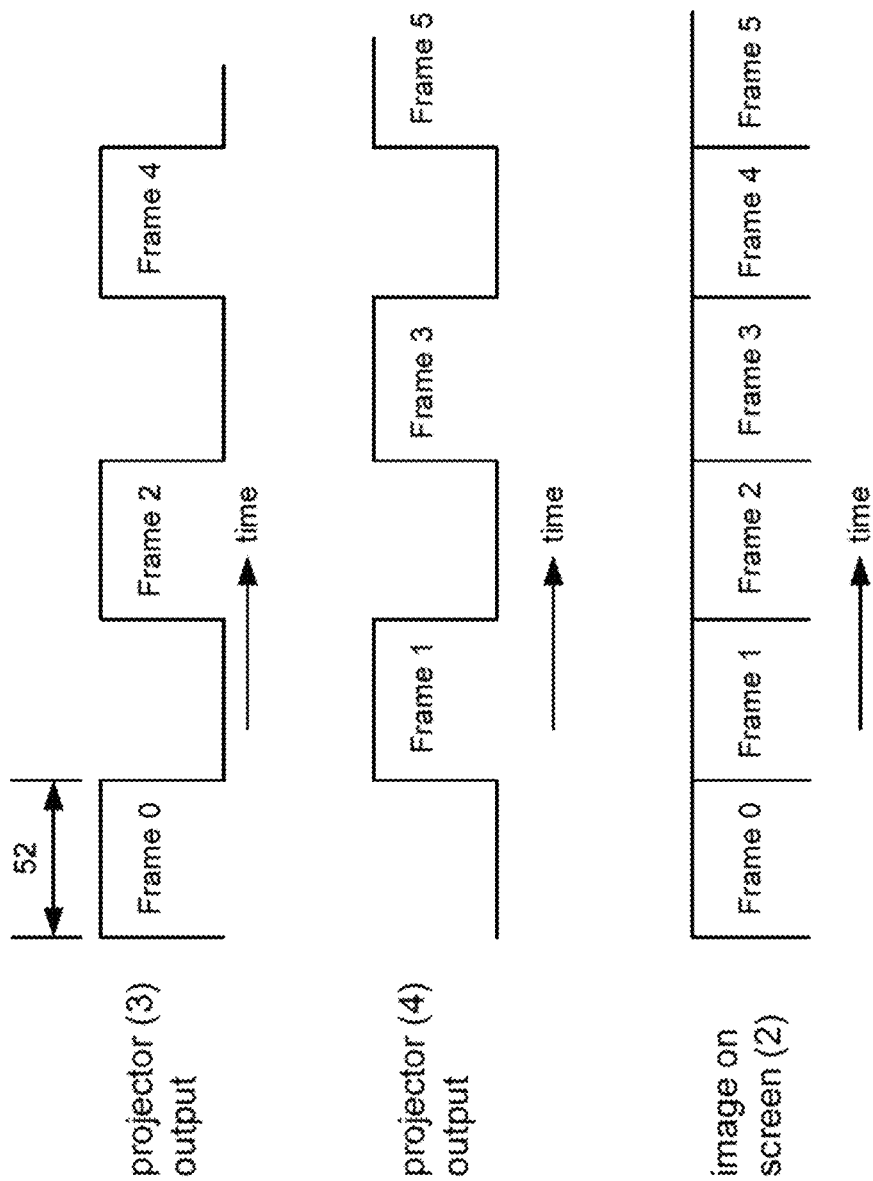
FIG. 18 shows an illustrative timing diagram for the high frame rate mode according to one embodiment of the present invention.

With this flexible projection system, a number of other embodiments of the invention are possible. FIG. 17 illustrates an embodiment of the invention where a high frame rate display is achieved using two lower frame rate projectors with the addition of mechanical or electronic shutter (26, 27) that alternately blocks the light from each projector. In this embodiment the shutter is located between the projector and screen, but it may also be located in other positions inside the projector. In this embodiment the high frame rate (doubled this example) projection is divided up; the even frames are displayed by the master projector (3) and the odd frames are displayed by the second projector (4) as depicted by the projection frame sequence shown in FIG. 18. The even frames are projected at a different time than the odd frames; while the even frames are projected the odd frame projector image is blocked. In this embodiment, the odd frames are warped relative to the even frames before display. The warping can be accomplished by generating a pixel correspondence map as described above and using this to warp the odd image frames.

Figure 19:
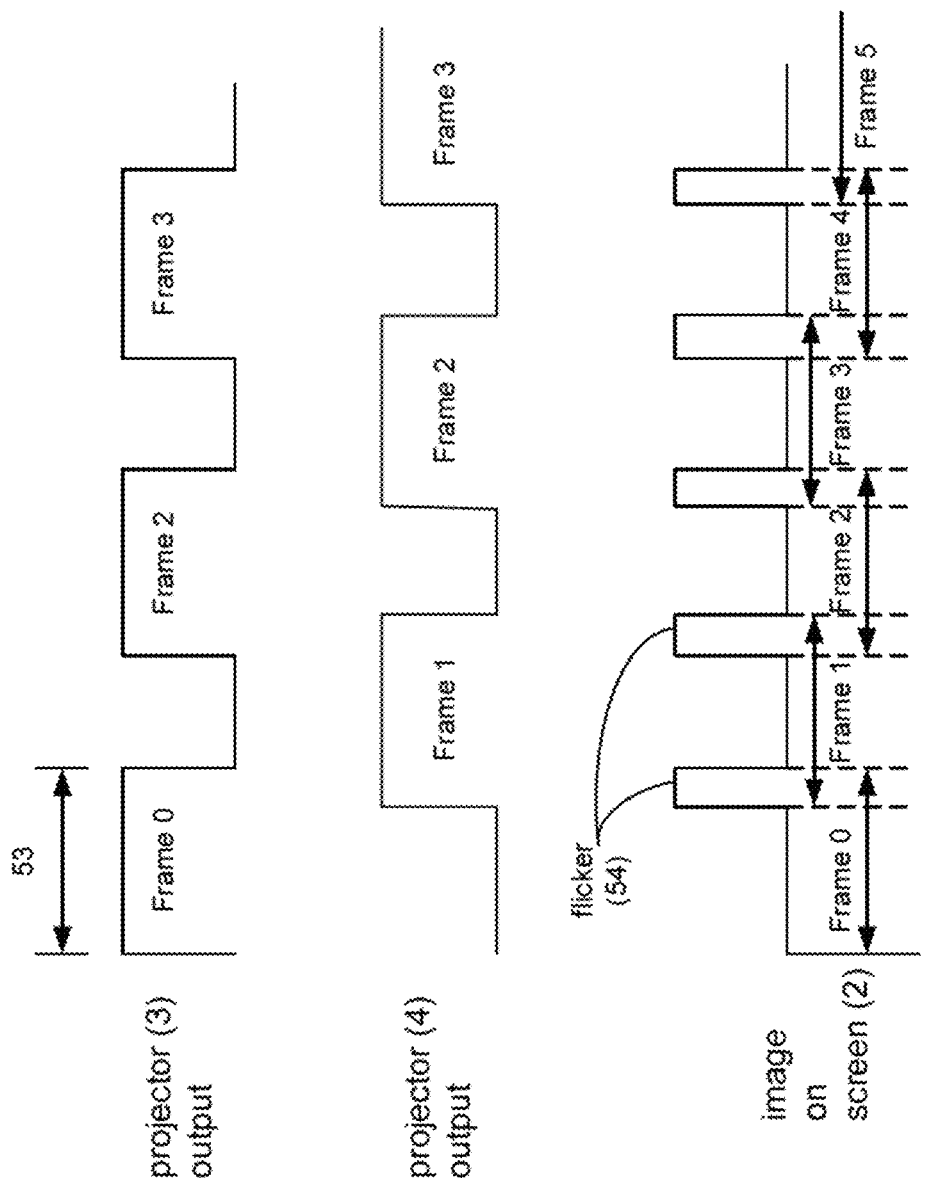
FIG. 19 shows an illustrative timing diagram for the high frame rate mode with increased brightness according to one embodiment of the present invention.

This embodiment requires exact matching of the projector brightness and color balance between projected images to avoid flicker. Techniques are already known involving the use of a camera to feedback luminance spatial profile information (magnitude and spectral composition), which is then used to modify the signal to the electronic projector to shape an image luminance profile. In this case the luminance profile of the slave projector (and/or the master projector) can be shaped so that the luminance profiles of both projectors match. This luminance shaping information can be stored and used to modify the image data to the projector as outlined in U.S. Pat. No. 5,386,253 to Fielding. One trade-off of using two lower frame rate projectors to achieve a higher frame rate is that screen image brightness is reduced since only the light of one projector is being projected onto the screen at any one time. To compensate for this it is possible to regain some of the screen brightness by increasing the duty cycle (53) of the projected image, as shown in FIG. 19, without significantly degrading the effect of the higher frame rate. The flicker (54) caused by this increase in duty cycle will be at twice the frame rate of the projector, in the preferred embodiment this would be 48 Hz, which is not readily detectable by the human eye.

Figure 20:
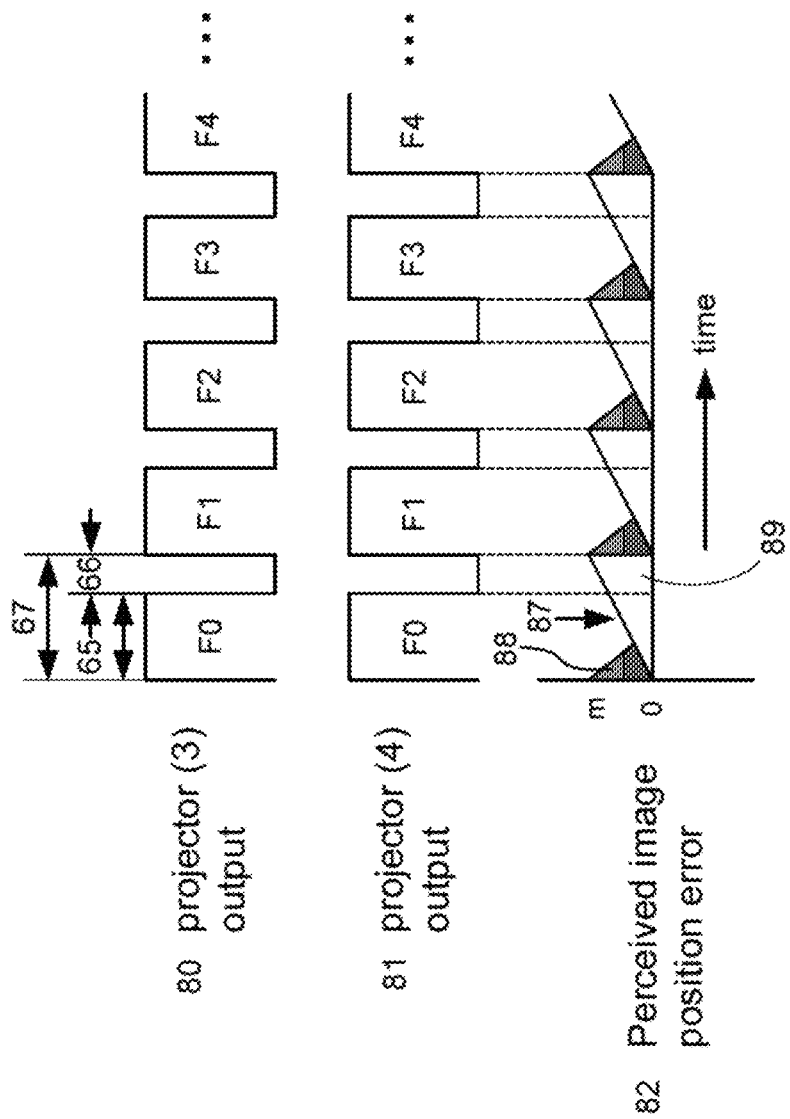
FIG. 20 shows an illustrative timing diagram for a high frame rate mode of operation with shutter for reduced motion artifacts according to one embodiment of the present invention.

FIG. 20 shows another embodiment of the projection system designed where motion artifacts are reduced in a multiple projector system. In electronic projectors where the light output is sustained over the entire frame time, motion blur results (such as, for example, as described in Kurita, SID DIGEST 2001, 986). By forcing the projector to output light intermittently, the motion artifacts are reduced. FIG. 20 shows the frame period 67 to be divided into an exposure 65 and a blanking interval 66. The blanking interval can provide two benefits. The first is to reduce motion artifacts by forcing the projector to emit light intermittently. The second is to eliminate artifacts due to the response time of the projector.

Graph 82 in FIG. 20 characterizes the extent of motion blur that becomes apparent when a moving object is observed sequentially over a series of image frames. In a simplified explanation of this curve the perceived image position error is the amount of positional error between an actual moving object and, what is shown on the display. The perceived image position error increases from the moment the display initially shows the moving object's position up to when the next image frame displays the object's updated position. The degree of positional error in curve 87 of the moving object will become apparent to the observer watching the moving object on the display as image blur. The longer the period 67 of the image frame the more blur the same displayed object in motion will appear to have to the display viewer. In the case of slower responding image projectors, such as LC type, the image pixel takes a finite time to transition to its value in the subsequent frame. The cross hatched area 88 represents the range of errors the pixel value may have during this transition period.

The timing shown in FIG. 20 shows the shutter blocking a portion 66 of the projected screen image frame 67 prior to the subsequent frame. This action has created a reduction in the amount of error that leads to image blur. In this situation the reduction is equivalent to the area 89. The advantage will be a reduction in motion blur, however, this is at the cost of reduced brightness.

The blocking interval 66 can also be shifted to block out a portion of the projected image during part of or all of the pixel transition time. The advantage will be a reduction of motion artifacts but also at the cost of reduced brightness.

Despite there being a reduction in image brightness to get a reduction in motion artifacts this loss of image brightness is somewhat compensated by the brightness gained from using multiple projectors to overlap images on the screen.

By adjusting the shutter blocking period or by shifting the shutter blocking period or a combination of both it is possible for scenes with much motion to get an overall perceived presentation improvement by finding the optimum trade-off between reducing motion artifacts with image brightness.

Figure 21:
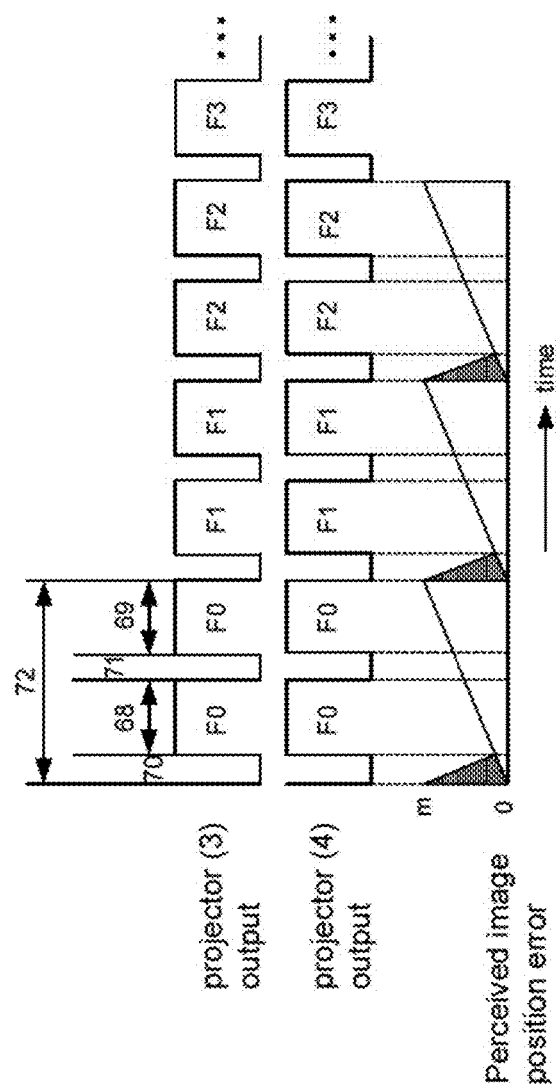
FIG. 21 shows an illustrative timing diagram for operation with double shutter for reduced artifacts according to one embodiment of the present invention.

FIG. 21 shows another embodiment where the frame rate of the projector is low enough that the intermittent projection of light results in flicker that is noticeable to the human eye. In this case the exposure is divided into two periods 68 and 69 and likewise the blanking period would be divided into 70 and 71. In this scenario by adjusting the shutter blocking period or by shifting the shutter blocking period or a combination of both it is possible for scenes with much motion to get an overall perceived presentation improvement by finding the optimum trade-off between reducing motion artifacts with image brightness.

In situations where 2D images have been converted to a stereoscopic pair of images for 3D projection, the synthetic eye is often rendered at a lower resolution to reduce costs and render times. In this situation the higher resolution image would be sent to the slave projector (4) via the warping engine to ensure the image quality enhancement contributed by the slave projector is maximized.

In situations when a stereoscopic pair of images is acquired, one image in the stereo pair can be used to electronically enhance the resolution of the other image using an appropriate image enhancement algorithm, in this situation the enhanced image would then be sent to the projector that uses the warped image (4) to ensure the image quality enhancement contributed by the second projector is maximized.

A digital enhancement can be applied to a 2D image to improve its resolution. This higher resolution image may be used in the embodiment shown in FIG. 4 to improve image quality.

As stated earlier, warping requires interpolation that causes a slight degradation in image quality. In another embodiment of this application, image fidelity is restored by applying digital enhancement algorithms to the warped image.

The foregoing description of embodiments of the invention has been presented only for the purpose of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments with various modifications as are suited to the particular use contemplated.

That which is claimed:

1. A method of generating composite images with a projection system comprising a first projector and at least a second projector, comprising:
generating a correspondence map of pixels for images by determining offsets between pixels from at least a second image from the second projector and corresponding pixels from a first image from the first projector;
receiving a source image;
warping the source image based at least in part on the correspondence map to produce a warped image;
displaying the source image by the first projector and displaying the warped image by the second projector to create a composite image; and
emitting light by the first projector within gaps between pixels of the second projector over substantially all of a projected image area between first projected pixels and second projected pixels such that fractional offsets between pixels from the first projector and the second projector are in a range from 0.5 pixels to 0 pixels to produce an image enhancement that is not constant across the screen.

2. The method of claim 1, wherein generating a correspondence map of pixels comprises generating the correspondence map from measured data.

3. The method of claim 1, wherein the first image and the second image are the same test pattern.

4. The method of claim 1, wherein the source image is superimposed on the warped image to create the composite image.

5. The method of claim 1, wherein the source image and the warped image are part of one of a two-dimensional presentation or a three-dimensional presentation.

6. The method of claim 1, wherein the correspondence map is generated by projecting a test pattern with the first projector, projecting the test pattern with the second projector, and measuring positions of second pixels in the test pattern from the second projector relative to corresponding first pixels in the test pattern from the first projector.

7. The method of claim 6, wherein the test pattern comprises at least one of an array of dots comprised of at least one pixel, multiple pixel dots with a uniform illumination distribution, multiple pixel dots with a non-uniform illumination distribution, or multiple pixel dots with a Gaussian distribution profile and further comprising at least one of:
adjusting the test pattern to compensate for a screen gain;
generating a separate test pattern and calculating a separate correspondence map for each color; or
generating the test pattern and calculating a correspondence map for each color.

8. The method of claim 1, further comprising pre-distorting the source image to remove at least one of keystone distortion or lens distortion, before display.

9. The method of claim 1, wherein the first projector and the second projector each comprise a plurality of color channels, the first projector and the second projector each comprise projection lenses that output light with different polarization states for the plurality of color channels, and the warping is performed on at least one color channel from each of the first projector and the second projector.

10. The method of claim 5, wherein images in the three-dimensional presentation are coded to allow stereoscopic images to be separated by glasses worn by viewers.

11. The method of claim 5, wherein the source image is of higher resolution than a display resolution of the first projector and the second projectors.

12. The method of claim 11, wherein the source image comprises a three-dimensional stereoscopic pair of a high-resolution image and a lower resolution image, wherein the high-resolution image is warped.

13. The method of claim 1, further comprising shuttering the first projector and the second projector to establish a blanking interval.

14. The method of claim 13, further comprising at least one of:
adjusting the blanking interval's length of time;
adjusting the blanking interval's length of time during the display of the source image and the warped image;
synchronizing the blanking interval to the display of the source image and the warped image; or
adjusting a beginning of the blanking interval.

15. A projection system capable of generating composite images, comprising:
a first projector;
at least a second projector;
an alignment camera capable of recording at least a first image produced by the first projector and at least a second image produced by the second projector used for generating a correspondence map of pixels for images by determining offsets between pixels from the second image and corresponding pixels from the first image;
a source image buffer capable of supplying a source image; and
a warping unit capable of warping the source image based at least in part on the correspondence map to produce a warped image,
wherein the first projector is configured to display the source image and the second projector is configured to display the warped image to create a composite image,
wherein the first projector is further configured for emitting pixel light within the gaps between pixels of the second projector over substantially all of a projected image area between first projected pixels and second projected pixels such that fractional offsets are between pixels from the first projector and the second projector in a range from 0.5 pixels to 0 pixels to produce an image enhancement that is not constant across the screen.

16. The projection system of claim 15, wherein the projection system is capable of displaying two-dimensional presentations and three-dimensional presentations.

17. The projection system of claim 15, wherein the correspondence map is generated by an method using measured data.

18. The projection system of claim 15, wherein the first image and the second image are the same test pattern.

19. The projection system of claim 15, wherein the source image is superimposed on the warped image to create the composite image.

20. The projection system of claim 15, further comprising a first shutter for the first projector and a second shutter for the second projector, wherein each shutter is capable of inserting a blanking interval between frames to reduce motion artifacts.

21. The method of claim 1, wherein the fraction of the pixel by which the image pixels of the warped image are offset with respect to the corresponding image pixels of the source image varies among the image pixels.

22. The method of claim 1, wherein the image pixels of the warped image are offset with an integer component removed with respect to corresponding image pixels of the source image.

23. The method of claim 22, wherein generating a correspondence map of pixels for images by determining offsets between pixels from at least a second image from the second projector and corresponding pixels from the first image from the first projector comprises determining offsets using sub-pixel accuracy,
wherein at least some of the image pixels of the warped image are offset by a half pixel with respect to at least some of the corresponding image pixels of the source image.

24. The projection system of claim 15, wherein the fraction of the pixel by which the image pixels of the warped image are configured to be offset with respect to the corresponding image pixels of the source image is adapted to vary among the image pixels.

25. The projection system of claim 15, wherein the image pixels of the warped image are configured to be offset with an integer component removed with respect to corresponding image pixels of the source image.

26. The projection system of claim 25, wherein the projection system is configured for determining offsets between pixels from at least a second image from the second projector and corresponding pixels from the first image from the first projector by determining offsets using sub-pixel accuracy,
wherein at least some of the image pixels of the warped image are configured to be offset by a half pixel with respect to at least some of the corresponding image pixels of the source image.

27. The method of claim 1, wherein generating the correspondence map includes using an offset between corresponding centroids of a test pattern projected by the first projector and by the second projector.

28. The method of claim 27, wherein the test pattern includes an array of dots.

29. The method of claim 28, wherein the dots are more than one pixel.

30. The method of claim 27, further comprising:
determining the offset between the corresponding centroids using a camera pixel scale that is different than a first projector pixel scale and a second projector pixel scale.

31. The method of claim 27, further comprising:
determining the offset between the corresponding centroids using a test pattern portion covering multiple pixels in a camera image of the test pattern portions.

32. The method of claim 1, further comprising:
generating the correspondence map using a test pattern adjusted to compensate for screen gain.

* * * * *